US012754945B2

(12) United States Patent
Khabiri et al.

(10) Patent No.: US 12,754,945 B2
(45) Date of Patent: Oct. 6, 2026

(54) CODE-BASED PATTERN EXTRACTION AND APPLICATION IN A NAMED ENTITY RECOGNITION PIPELINE

(71) Applicant: International Business Machines Corporation, Armonk, NY (US)

(72) Inventors: Elham Khabiri, Briarcliff Manor, NY (US); Yingjie Li, Chappaqua, NY (US); Bhavna Agrawal, Armonk, NY (US); Anuradha Bhamidipaty, Yorktown Heights, NY (US); Joseph M. Lindquist, Highland Mills, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 149 days.

(21) Appl. No.: 18/066,600

(22) Filed: Dec. 15, 2022

(65) Prior Publication Data

US 2024/0202226 A1 Jun. 20, 2024

(51) Int. Cl.
*G06F 16/35* (2025.01)
*G06F 18/2325* (2023.01)
(Continued)

(52) U.S. Cl.
CPC .......... *G06F 16/35* (2019.01); *G06F 18/2325* (2023.01); *G06F 40/295* (2020.01); *G06F 40/30* (2020.01)

(58) Field of Classification Search
CPC .... G06F 16/35; G06F 18/2325; G06F 40/295; G06F 40/30
See application file for complete search history.

(56) References Cited

U.S. PATENT DOCUMENTS 11,080,336 B2 * 8/2021 Van Dusen ............ G06Q 10/10
2019/0361879 A1 * 11/2019 Rogynskyy .......... G06Q 10/107
(Continued)

FOREIGN PATENT DOCUMENTS

CN 111291565 A 6/2020
CN 112257441 1/2021
(Continued)

OTHER PUBLICATIONS

Nonaka et al., "A Compression-Based Multiple Subword Segmentation for Neural Machine Translation". Electronics, 11(7), p. 1014. (2022).

(Continued)

*Primary Examiner* — Merilyn P Nguyen
(74) *Attorney, Agent, or Firm* — Amin, Turocy & Watson, LLP

(57) ABSTRACT

Various systems and methods are presented regarding code-based pattern extraction (Code-PE) and the application of Code-PE to a named entity recognition pipeline. Patterns can be generated from named entities, wherein the entities have an assigned type. Codes are identified within the entities, subsequently vectorized and clustered based upon the presence of the identified codes. Patterns are identified for the respective clusters. The patterns can be applied to an untyped entity, in the event of the pattern matching, the entity can be typed with the type assigned to the pattern. The typed entity can be used to recursively update knowledge regarding typed- and untyped-entities. In the event a pattern incorrectly types an entity, the pattern can be retrained with the updated knowledge.

16 Claims, 11 Drawing Sheets

(51) Int. Cl.
*G06F 40/295* (2020.01)
*G06F 40/30* (2020.01)

(56) References Cited

U.S. PATENT DOCUMENTS

| | | | |
|---|---|---|---|
| 2020/0372075 A1* | 11/2020 | Rogynskyy | G06F 16/288 |
| 2021/0390951 A1 | 12/2021 | Gadde et al. | |
| 2022/0067277 A1 | 3/2022 | Pentyala et al. | |
| 2023/0046471 A1* | 2/2023 | Enuka | G06F 16/24558 |
| 2024/0135678 A1* | 4/2024 | Saxena | G06V 20/62 |
| 2026/0004371 A1* | 1/2026 | O'Malley | G06Q 50/184 |

FOREIGN PATENT DOCUMENTS

| | | |
|---|---|---|
| CN | 111738007 B | 4/2021 |
| CN | 113158652 A | 7/2021 |
| CN | 114780741 A | 7/2022 |
| CN | 115048934 A | 9/2022 |
| IN | 113361278 B | 2/2022 |

OTHER PUBLICATIONS

Wang et al., Revisiting Regex Generation for Modeling Industrial Applications by Incorporating Byte Pair Encoder) arXiv preprint arXiv:2005.02558. (Year 2020).
"Labelling Functions: What are labelling functions and how do you create them?" Programmatic: https://docs.programmatic.humanloop.com/key-concepts/labelling-functions (Year 2022).
"Detecting spouse mentions in sentences" Snorkel https://www.snorkel.org/use-cases/spouse-demo (Web accessed Year 2022).
"Online Regex Generator", Online Regex Generator Tool, online available at <https://www.javainuse.com/rexgenerator> retrieved on Nov. 16, 2022, 3 pages.
Khabiri et al., "Big Data Techniques for Industrial Problems with Little Data", IBM Research, 2022, 5 pages.
Anaby-Tavor, "Do Not Have Enough Data? Deep Learning to the Rescue!", The Thirty-Fourth AAAI Conference on Artificial Intelligence (AAAI-20), Nov. 8, 2019, 08 pages.
Chen et al., "Low-Resource Named Entity Recognition via the Pre-Training Model", Pre-Training Model. Symmetry 2021, May 2, 2021, 15 pages.
Chiticariu et al., "Rule-based Information Extraction is Dead! Long Live Rule-based Information Extraction Systems!", Proceedings of the 2013 Conference on Empirical Methods in Natural Language Processing, Oct. 18-21, 2013, pp. 827-832.
Cui et al., "Data Augmentation for Deep Neural Network Acoustic Modeling", IEEE/ACM Transactions on Audio, Speech and Language Processing (TASLP), vol. 23, Issue 9, Sep. 1, 2015, pp. 1469-1477.
Devlin et al., "BERT: Pre-training of Deep Bidirectional Transformers for Language Understanding", arXiv:1810.04805v2 [cs. CL], May 24, 2019, 16 pages.
Krizhevsky et al., "ImageNet Classification with Deep Convolutional Neural Networks", Jun. 2017, 07 pages.
Kumar et al., "Submodular Optimization-based Diverse Paraphrasing and its Effectiveness in Data Augmentation", Proceedings of NAACL-HLT 2019, Jun. 2-Jun. 7, 2019, pp. 3609-3619.
Lecun et al., "Deep learning", Nature, vol. 521, May 28, 2015, 09 pages.
Li et al., "A Survey on Deep Learning for Named Entity Recognition", EEE Transactions on Knowledge and Data Engineering, vol. 34, No. 1, Mar. 18, 2020, pp. 50-70.
Liu et al., "Few-shot learning for name entity recognition in geological text based on GeoBERT", Mar. 11, 2022, 13 pages.
Liu et al., "RoBERTa: A Robustly Optimized BERT Pretraining Approach", Jul. 26, 2019, 13 pages.
No Author, "re.findall not returning full match?", Mar. 17, 2026, 04 pages, https://stackoverflow.com/ questions/18425386/re-findall-not-returning-full-match.
Radford et al., "Language Models are Unsupervised Multitask Learners", 2019, 24 pages.
Shafqat et al., "Standard NER Tagging Scheme for Big Data Healthcare Analytics built on Unified Medical Corpora", Journal of Artificial Intelligence and Technology, 2022, 2, Aug. 22, 2022, pp. 152-157.
Shen et al., "A Simple but Tough-to-Beat Data Augmentation Approach for Natural Language Understanding and Generation", arXiv:2009.13818v2 [cs.CL], Oct. 23, 2020, 10 pages.
Vajjala et al., "Practical Natural Language Processing", Publisher(s): O'Reilly Media, Inc., Jun. 2020, 04 pages.
Vaswani et al., "Attention Is All You Need", arXiv:1706.03762v7 [cs.CL], Aug. 2, 2023, 15 pages.
Wei et al., "EDA: Easy Data Augmentation Techniques for Boosting Performance on Text Classification Tasks", arXiv:1901.11196v2 [cs.CL], Aug. 25, 2019, 09 pages.
Wu et al., "Conditional BERT Contextual Augmentation", arXiv: 1812.06705v1 [cs.CL], Dec. 17, 2018, 09 pages.
Yu et al., "QANet: Combining Local Convolution with Global Self-Attention for Reading Comprehension", Published as a conference paper at ICLR 2018, arXiv: 1804.09541v1 [cs.CL] Apr. 23, 2018, 16 pages.
Zhang et al., "Construction research and applications of industry chain knowledge graphs", Jul. 19, 2022, pp. 120-132.

* cited by examiner

FIG. 4 FLOW PATH A

FLOW PATH B

CODE-BASED PATTERN EXTRACTION AND APPLICATION IN A NAMED ENTITY RECOGNITION PIPELINE

This invention was made with government support by the United States Military Academy (USMA). The government has certain rights to this invention.

BACKGROUND

Named entity recognition (NER) is a field of information extraction in computational linguistics and natural language processing recognition that seeks to identify entities mentioned in unstructured text and classify them based upon pre-defined categories. Items of interest can be identified in sample sequences and/or strings in text or speech, where the items can be phonemes, syllables, letters, words, and the like. Various techniques can be utilized such as byte-pair encoding (BPE), locally consistent parsing (LCP), N-grams, and the like.

The above-described background is merely intended to provide a contextual overview of some current issues and is not intended to be exhaustive. Other contextual information may become further apparent upon review of the following detailed description.

SUMMARY

The following presents a summary to provide a basic understanding of one or more embodiments described herein. This summary is not intended to identify key or critical elements, or delineate any scope of the different embodiments and/or any scope of the claims. The sole purpose of the Summary is to present some concepts in a simplified form as a prelude to the more detailed description presented herein.

In one or more embodiments described herein, systems, devices, computer-implemented methods, methods, apparatus and/or computer program products are presented that facilitate utilizing code-based pattern extraction to identify and/or type entities in a domain.

According to one or more embodiments, a system is provided that can identify and type entities based upon knowledge pertaining to already typed entities having identified patterns. The system can comprise a memory that stores computer executable components and a processor that executes the computer executable components stored in the memory. The computer executable components can comprise a pattern component that generates a pattern that represents a cluster of entities, wherein the entities have a common type. The pattern component can further type an untyped entity based on the pattern, wherein the common type is assigned to the untyped entity. In an embodiment, the one or more entities in the cluster of entities can be respectively identified by a string, wherein, in non-exhaustive list, the string is at least one of a sequence of speech, text, alphanumerics, letters, or numbers. In an embodiment, the pattern can pertain to a Named-Entity Recognition domain.

In another embodiment, the computer executable components can further comprise a code component that identifies one or more codes within the string respectively pertaining to the one or more entities in the cluster of entities. In a further embodiment, the computer executable components can further comprise a weight component that applies a weight to the code identified in the one or more codes. In another embodiment, the computer executable components can further comprise a vector component that vectors the weighted codes to create the cluster. In a further embodiment, the computer executable components can further comprise a matching component that determines whether the pattern is accurately identifying an untyped entity has the same format as a typed entity. In a further embodiment, the matching component can be further configured to identify the pattern in a statement, wherein the statement provides context regarding the untyped entity and determine whether the context matches the type assigned to the untyped entity by the pattern. In an embodiment, the matching component, in response to a determination that the context matches the type assigned by the pattern to the untyped entity, can be further configured to retain the pattern. In another embodiment, the matching component, in response to a determination that the context does not match the type assigned by the pattern to the untyped entity, can be configured to discard the pattern.

In other embodiments, elements described in connection with the disclosed systems can be embodied in different forms such as computer-implemented methods, computer program products, or other forms. For example, in an embodiment, a computer-implemented method can be utilized for typing an entity based on recognizing a pattern describing the entity, wherein the pattern has been previously typed. In an embodiment, the computer-implemented method can comprise generating, by a device operatively coupled to a processor, a pattern that represents a cluster of entities, wherein the entities have a common type and typing, by the device, an untyped entity based on the pattern, wherein the common type is assigned to the untyped entity.

In another embodiment, the one or more entities in the cluster of entities can be respectively identified by a string, the respective string is at least one of a sequence of speech, text, alphanumerics, letters, or numbers. In a further embodiment, the computer-implemented method can further comprise identifying, by the device, one or more codes within the string respectively pertaining to the one or more entities in the cluster of entities. In another embodiment, the computer-implemented method can further comprise applying, by the device, a weight to the code identified in the one or more codes. In a further embodiment, the computer implemented method can further comprise vectorizing, by the device, the weighted codes to create the cluster. In a further embodiment, the computer implemented method can further comprise vectorizing, by the device, whether the pattern is accurately identifying an untyped entity has the same format as a typed entity.

In a further embodiment, the computer implemented method can further comprise identifying, by the device, the pattern in a statement, wherein the statement provides context regarding the untyped entity. The device can be configured to determine whether the context matches the type assigned to the untyped entity by the pattern, and (a) in response to a determination that the context matches the type assigned by the pattern to the untyped entity, retaining the pattern or (b) in response to determining that the context does not match the type assigned by the pattern to the untyped entity, discarding the pattern and removing the type assigned by the pattern.

Further embodiments can include a computer program product comprising a computer readable storage medium having program instructions embodied therewith, the program instructions executable by a processor can cause the processor to generate, by the processor, a pattern that represents a cluster of entities, wherein the entities have a common type. The program instructions can further cause the processor to type an untyped entity based on the pattern, wherein the common type is assigned to the untyped entity.

In a further embodiment, the program instructions can cause the processor to identify one or more codes within the string respectively pertaining to the one or more entities in the cluster of entities. In a further embodiment, the program instructions can further cause the processor to apply a weight to the code identified in the one or more codes. In another embodiment, the program instructions can cause the processor to vectorize the weighted codes to create the cluster.

In another embodiment, the program instructions can cause the processor to identify the pattern in a statement, wherein the statement provides context regarding the untyped entity. In another embodiment, the program instructions can cause the processor to determine, by the processor, whether the context matches the type assigned to the untyped entity by the pattern. In response to a determination, by the processor, that the context matches the type assigned by the pattern to the untyped entity, the processor can be configured to retain the pattern. Alternatively, in response to a determination, by the processor, that the context does not match the type assigned by the pattern to the untyped entity, the processor can be configured to discard the pattern and remove the type assigned by the pattern.

DESCRIPTION OF THE DRAWINGS

One or more embodiments are described below in the Detailed Description section with reference to the following drawings.

DETAILED DESCRIPTION

Figure 1:
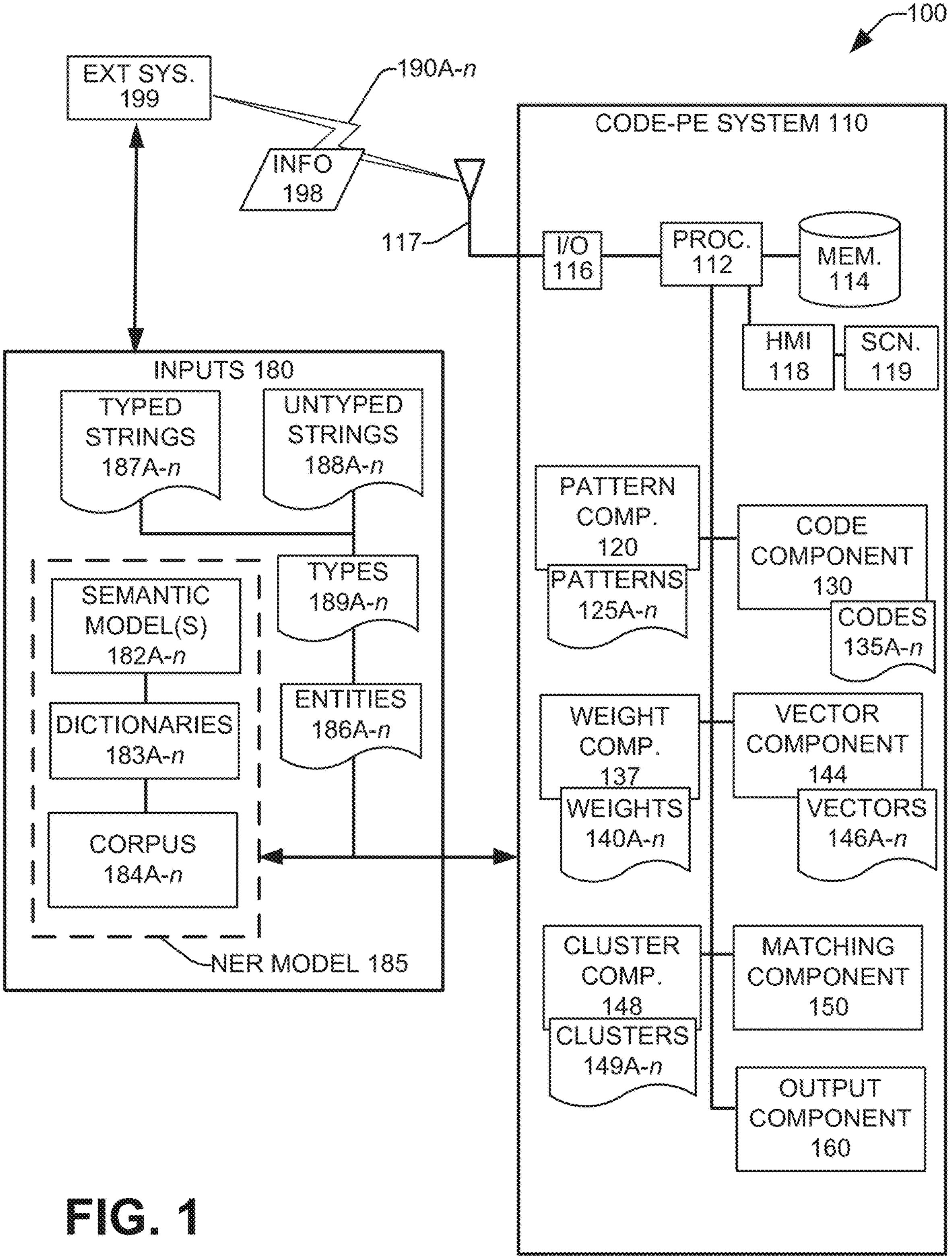
FIG. 1 illustrates a system that can be utilized for Code-PE and the application of Code-PE to a NER pipeline, in accordance with an embodiment.

The following detailed description is merely illustrative and is not intended to limit embodiments and/or application or uses of embodiments. Furthermore, there is no intention to be bound by any expressed and/or implied information presented in any of the preceding Background section, Summary section, and/or in the Detailed Description section.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

As used herein, "data" can comprise metadata. Further, ranges A-n are utilized herein to indicate a respective plurality of devices, components, signals etc., where n is any positive integer.

It is to be appreciated that while the various embodiments and examples presented herein are directed to an industrial domain and the identification/typing of equipment (e.g., pumps, valves, and the like) in a manufacturing facility, the various embodiments are not so limited and can be applied to any domain, information, data, entities, types, etc., which can be identified based upon a pattern generated based upon one or more codes identified based upon a string of text, numbers, words, utterances, vocabulary, and suchlike, utilized to identify an entity, an object, a subject, and suchlike. Further, while the various examples presented herein generally pertain to textual identifiers applied to components, the various embodiments can equally be applied to speech, utterances, snippets of speech, speech recordings, and the like.

A code (also known as a token, a subword) is a constructing block/component of a string, whereby a string can comprise a sequence of alphanumeric characters in text or speech. There are numerous ways in which a string can be coded and/or one or more codes extracted from a string. For example, identifying codes within the string 'FC411'. In a first technique, the coding can be based upon considering the frequency of codes in a corpus (e.g., a collection of texts, speech), utilizing such techniques as BPE and/or LCP, where codes such as 'FC', 'FC4', 'C4', '411' can be generated from the string 'FC411'.

In another technique, the string itself can be considered, with one or more N-gram codes being generated therefrom. A bigram (two character) approach applied to the string 'FC411' can generate codes such as 'FC', 'C4', '41', '11', e.g., based upon the starting position of the bigram extraction in the string. With a trigram (three character) approach, the following codes can be generated: 'FC4', 'C41', '411', again based upon the starting position of the trigram extraction within the string. Further, if the coding is alphanumeric-based, the codes 'FC' (word, w) and '411' (digits, d) can be extracted/generated.

In a further approach, the codes can be overlapping or non-overlapping, e.g., [FC, FC4, . . . ] or [FC, 411, . . . ]. In an alternative approach, the codes can be customized based on domain knowledge regarding how the string is utilized in and/or was generated for a current naming configuration/ application. For example, where the domain pertains to a manufacturing company, the domain knowledge can include information shared across the entire company (e.g., across multiple manufacturing centers located around the globe, a specific manufacturing center comprising multiple assembly lines, a specific assembly line, and suchlike). Continuing the example, 'FC' [is the name of a manufacturing plant] and '411' [is the name of a component in that plant]. In a further example scenario, a first component can be a pump in the manufacturing plant, while a second component can be a valve that is incorporated into, and forms part of, the operation of the pump. Hence, a question arises, "while it is known that the component FC411 is located in the manufacturing plant FC, does 411 denote a pump, a valve, or other entity?"

Further, strings can be constructed and/or identified based upon a pattern. A pattern can be considered to be similar to a Regular Expression (Regex). However, a Regex is typically a general expression that can be easily found within a collection of strings, while a pattern is typically configured so as to keep string identification as specific as possible. Hence, a goal of pattern identification can be to distinguish different types of components in an industrial domain, where each string may have a specific meaning. For example, sensors configured to measure temperature have a string pattern ending with the letter 'T', while those sensors configured to measure pressure have a string pattern ending with the letter 'P'. In a further example, an industrial environment includes various valves and various pumps. As shown in TABLE 1 below, when applying a Regex approach the various valves and pumps are not distinguished and/or separately identified as the Regex of \w{2} \d{3} comprising two alphabetical characters and three digits applied to the respective valve and pump string identifiers are the same, however, the patterns are not.

TABLE 1

DIFFERENCE IN SPECIFICITY BETWEEN A REGEX AND A PATTERN DERIVED VALUE(S).

| Entity Type | Instances/Named Entity | Regex | Pattern Approach |
|---|---|---|---|
| Valve | HS411, HS622 | \w{2}\d{3} | HS\d{3} |
| Pump | PM301, PM202 | \w{2}\d{3} | PM\d{3} |
| | | ↑ = Same value | ↑ = Different value |

Compared to the Regex approach, the pattern approach identifies specific entities based upon the 'HS' (e.g., a valve) and 'PM' (e.g., a pump) portions, wherein the 'HS' and 'PM' portions can be considered comparable to the initial characters extracted with the bigram extraction of a string based upon the first 2 characters in the string.

In the various embodiments presented herein, the disclosed subject matter can be directed to code-based pattern extraction (Code-PE) and the application of Code-PE to a data augmentation pipeline, such as a NER pipeline. Pattern recognition can be performed on input strings that have been previously typed (e.g., entity has been identified as a pump, a valve, and suchlike). Codes are identified within the strings, with the strings being vectorized as a function of the codes forming the string. Based upon the vectorization, the respective strings can be clustered, e.g., as a function of the vector defined for each respective string. Patterns can be generated based on the strings within a respective cluster. The pattern can then be applied to an identifier (string) of untyped entity: (a) in the event of the string matches the pattern, the entity can be typed with the type defined for the pattern, (b) in the event of the string does not match the pattern the entity is not typed with the type defined for the pattern. Identified patterns can be confirmed by analysis of semantic content, a dictionary, etc. (e.g., for the domain). Knowledge generated as a function of a pattern recognition of an entity regarding identifying the entity type can be utilized to further knowledge of a system (e.g., a process layout for a manufacturing facility). For example, nodes and edges of a system model of the manufacturing facility can be updated when a previously untyped entity becomes typed. Accordingly, the updated system model can now be utilized to enhance the pattern recognition process and further type entities that were previously untyped.

Turning now to the drawings, FIG. 1 illustrates a system 100 that can be utilized for Code-PE and the application of Code-PE to a NER pipeline, in accordance with an embodiment. Code-PE system 110 comprises various devices and components to identify codes and/or patterns, and to further determine types for one or more entities.

As shown the Code-PE system 110 include various components. A pattern component 120 can be utilized to generate one or more patterns 125A-n. The patterns 125A-n can be generated by the pattern component 120 based on analysis of various inputs 180. The inputs 180 can include various entities 186A-n, wherein an entity 186A-n can be described with an identifier comprising a typed string 187A-n or an untyped string 188A-n. For example, 'ABC1234' can be an identifier string 187A identifying an entity 186A, wherein the entity 186A is included in a process layout for a manufacturing plant, owing to the entity 186A having been previously typed (e.g., as a pump), the identifier string can be considered to be a typed string 187A. In another example, 'XYZ4567' can be an identifier string 187B identifying an entity 186B but the entity 186B has not been typed in the process layout, hence, it is unknown as to whether the entity is a pump, a valve, a machine, a motor, a programmable logic controller (PLC), etc., accordingly the identifier string of entity 186B can be considered to be an untyped string 188B. Per one or more embodiments presented herein, the existing knowledge regarding entity 186A (a pump) can be utilized to determine or infer that the entity 186B is a pump, or a valve, a motor, PLC, etc., with a corresponding change from untyped string 188B to a typed string 187B (assuming the entity 186B is typed).

Further, Code-PE system 110 can further include a code component 130. Code component 130 can be configured to identify the presence of various codes 135A-n in the respective strings 187A-n defined for a respective entity 186A-n. As previously mentioned, respective codes 135A-n can be identified/generated based on any suitable technology, BPE codes, LCP codes, code frequency, N-grams such as bigrams, trigrams, word association, digit association, overlapping codes, non-overlapping codes, and suchlike.

In another embodiment, Code-PE system 110 can further include a weight component 137, wherein weight component 137 can be configured to apply a respective weight 140A-n to the respective codes 135A-n. For example, a first code 135A can be assigned a weight of 140A while a second code 135B can be assigned a weighting of 140B, wherein the respective values of weights 140A and 140B can be the same or dissimilar. In an embodiment, the first code 135A may have a lower frequency of occurrence across the various strings 187A-n (and hence is more unique) than a second code 135B (and hence is less unique), such that the first code 135A can be assigned a weight 140A having a higher value (e.g., weight 140A=0.9) than a weight 140B (e.g., weight 140B=0.3) assigned to the second code 135B. In another example, a code 135C having a higher frequency than a code 135D can be assigned a weight 140C having a higher value than the weight 140D assigned to code 135D. Any system of weighting can be utilized for application of weights 140A-n to codes 135A-n.

The Code-PE system 110 can further include a vector component 144. Vector component 144 can be configured to vectorize the various strings 187A-n based on the weights 140A-n respectively assigned to the respective codes 135A-n which have been identified in the respective strings 187A-n (e.g., by the code component 130 in combination with the weight component 137). As further described herein, a first string 187D can have a vector 146D based on the occurrence of one or more codes 135A-n in the string and the respective weights 140A-n assigned to the respective code. Another string 187E may have less codes 135A-n included within that string, and those codes may have a lower weight assigned thereto, such that the vector 146E has a different value than vector 146D.

A cluster component 148 can be further included in the Code-PE system 110. The cluster component 148 can be configured to cluster/group the respective strings 187A-n into respective clusters 149A-n based upon the respective vectors 146A-n. Any suitable clustering technique can be utilized, e.g., vector quantization (VQ). In an embodiment, cluster component 148 can cluster the strings 187A-n based on their respective weighted vectors 146A-n. For example, a k-means clustering algorithm can be applied by the cluster component 148 to cluster the weighted vectors 146A-n into clusters comprising vectors that have the same, similar, or approximate value. The cluster component 148 can be configured to output the respective strings 187A-n based upon their presence in a respective cluster 149A-n.

The Code-PE system 110 can further include a matching component 150 which can be configured to confirm the accuracy of patterns 125A and ability to correctly type an entity 186A-n. As further described, when an entity is being typed, further information can be identified relating to the entity and if the information supports the typing the respective pattern/type can be retained, if the information does not support the typing then the pattern can be rejected and/or further training conducted to improve the accuracy of the code-pattern process.

An output component 160 can be further included in the Code-PE system 110, wherein the output component 160 can be configured to generate and distribute any patterns 125A-n, codes 135A-n, weights 140A-n, vectors 146A-n, clusters 149A-n, information regarding entities 186A-n, types strings 187A-n, untyped strings 188A-n, and suchlike. The output component 160 can be configured to output the various information for presentation on an HMI (e.g., HMI 118) or as an output to an external system (e.g., via signal 190A-n), wherein the information can be outputted in a data packet 198.

As further described herein, the pattern component 120 can be further configured to identify respective patterns 125A-n in each cluster of strings 187A-n, wherein the type (e.g., pump, valve, and suchlike) associated with the strings 187A-n is known as the strings 187A-n were typed as a function of incorporation into the process layout of the manufacturing plant, as previously described. Accordingly, the generated patterns 125A-n can now be applied to other information (e.g., in inputs 180) to identify respective patterns 125A-n and type strings in the untyped strings 188A-n in the other information. Given that the typed strings 187A-n all have a type, then an untyped string 188A-n can be typed based upon the untyped string 188A-n matching a pattern 125A-n wherein the pattern 125A-n was generated from a typed string 187A-n.

As further shown in system 100, various inputs 180 can be utilized with the Code-PE system 110. As previously mentioned, entities 186A-n having respective typed strings 187A-n can be applied to the Code-PE system 110, from which patterns 125A-n can be generated. In an aspect, the entities 186A-n having typed strings 187A-n can be considered to be operating as training data from which the patterns 125A-n can be generated. Further, entities 186A-n having respective untyped strings 188A-n can be considered to be functioning as unknown data to which the patterns 125A-n are applied to and thus convert the untyped strings 188A-n into typed strings 187A-n. Hence, the various embodiments presented herein enable an initial situation of "here is a list of components [entities] identified in a process chart in a factory, but what each component actually is, is unknown" to become a subsequent situation of "again, here is the process chart, and by applying the Code-PE system [e.g., Code-PE system 110] to the process chart, the following components have been identified and typed, e.g., as a pump, valve, PLC, etc." Accordingly, a semantic model 182P can be iteratively updated per the various embodiments presented herein, as described further, below. Further, while the respective entities 186A-n, the typed strings 187A-n, and untyped strings 188A-n are presented as being inputs 180 to the Code-PE system 110, these components can also be outputs from the Code-PE system 110. For example, as an entity 186A-n is changed from an untyped string 188A-n to a typed string 187A-n, the entity and the newly assigned type can be output (e.g., via output component 160) and used to update (e.g., recursively) a factory process chart (e.g., any of semantic models 182A-n) as further described herein. Further, one or more types 189A-n can be identified for a domain (e.g., pumps, valves, and suchlike), wherein the types can be assigned as part of the pattern-typing process (e.g., by pattern component 120) when an untyped string 188A-n is typed to become a typed string 187A-n.

Figure 8:
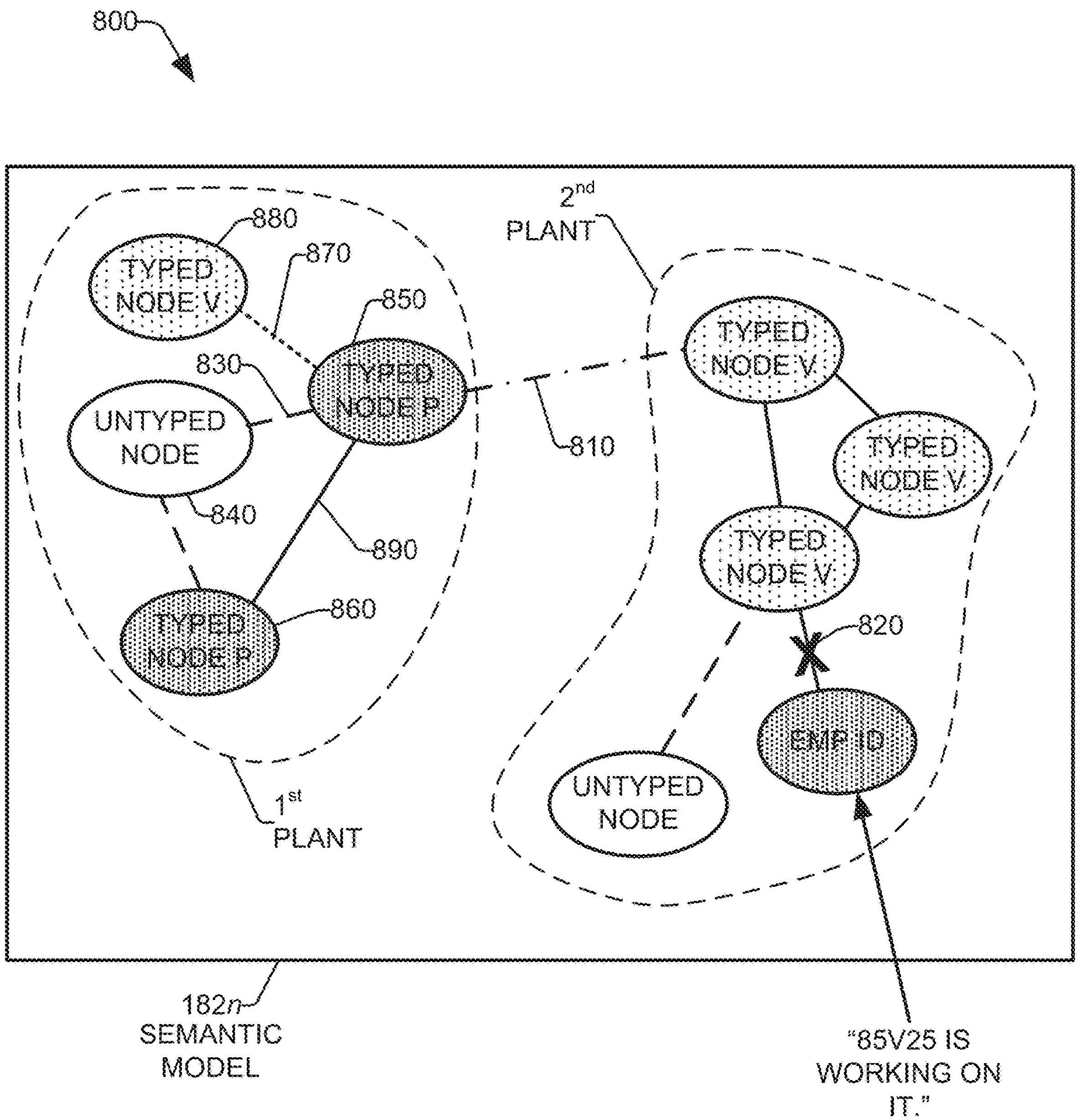
FIG. 8 presents a schematic of a semantic model to convey various concepts presented herein in accordance with at least one embodiment.

As mentioned, the inputs can include one or more semantic models 182A-n, wherein an example semantic model 182*n* is presented and described in FIG. 8. In an embodiment, semantic models 182A-n can be utilized to provide context between entities 186A-n based on their respective proximity. The semantic models 182A-n can provide an indication of which entities 186A-n are close to each other (e.g., located on the same assembly line) and which entities 186A-n are further away (e.g., located on different assembly lines, different manufacturing plant). The semantic models 182A-n can be further configured to show interconnectivity between the respective entities 186A-n. e.g., as defined in a process flow diagram. For example, the respective entities 186A-n can be presented as nodes in a semantic model, the node representation of the entities 186A-n can be colored based upon the respective typed strings 187A-n, e.g., a first color is a valve, a second color is a pump, and suchlike. Entities 186A-n of a similar type can also be connected via edges to a particular type, as further described herein.

As further shown, an input 180 can include one or more dictionaries 183A-n. As further described, the one or more dictionaries 183A-n can be utilized to provide context to the one or more entities 186A-n. A dictionary can include entities, identifiers, types, strings, codes, vocabulary, etc., that are known/previously defined for a domain. Analysis of a dictionary can assist with typing an entity 186A-n, and can further, be utilized to confirm a pattern 125A-n has been correctly typed, as well as to update (e.g., iteratively) a semantic model (e.g., any of semantic models 182A-n).

System 100 can further include one or more corpus 184A-n (corpi, corpora, corpuses) as an input 180, wherein a respective corpus can comprise a collection of texts, writings, speech recordings, and suchlike, obtained for and/or pertaining to the domain. As further described, the corpora 184A-n can be analyzed to provide context to an unknown entity (e.g., entity 186N), confirm a pattern (e.g., pattern 125N) has been correctly typed, and further, information provided by a corpus (e.g., corpus 184N) can be utilized to update (e.g., iteratively) a semantic model (e.g., semantic model 182N).

As shown in FIG. 1, the Code-PE system 110 can include a processor 112 and a memory 114, wherein the processor 112 can execute the various computer-executable components, functions, operations, etc., presented herein. The memory 114 can be utilized to store the various computer-executable components, functions, code, etc., as well as any of the inputs 180 (e.g., semantic models 182A-n, dictionaries 183A-n, and/or corpora 184A-n), information regarding entities 186A-n, including typed strings 187A-n, untyped strings 188A-n, types 189A-n, and suchlike), patterns 125A-n, codes 135A-n, weights 140A-n, vectors 146A-n, and suchlike.

As further shown, the Code-PE system 110 can include an input/output (I/O) component 116, wherein the I/O component 116 can be a transceiver configured to enable transmission/receipt of information (e.g., semantic models 182A-n, dictionaries 183A-n, and/or corpora 184A-n, information regarding entities 186A-n (including typed strings 187A-n, untyped strings 188A-n, types 189A-n, and suchlike), patterns 125A-n, codes 135A-n, weights 140A-n, vectors 146A-n, and suchlike) between the Code-PE system 110 and any external system(s) 199, e.g., data systems configured to store information about the entities 186A-n, such as the semantic models 182A-n, dictionaries 183A-n, and/or corpora 184A-n. I/O component 116 can be communicatively coupled, via an antenna 117, to the remotely located devices and systems 199. Transmission of data and information between the Code-PE system 110 (e.g., via antenna 117 and I/O component 116) and the remotely located devices and systems 199 can be via the signals 190A-n. Any suitable technology can be utilized to enable the various embodiments presented herein, regarding transmission and receiving of signals 190A-n. Suitable technologies include BLUETOOTH®, cellular technology (e.g., 3G, 4G, 5G), internet technology, ethernet technology, ultra-wideband (UWB), DECAWAVE®, IEEE 802.15.4a standard-based technology, Wi-Fi technology, Radio Frequency Identification (RFID), Near Field Communication (NFC) radio technology, and the like. Alternatively, the external system 199 can be communicatively coupled within the same system, e.g., comprise respective components in a computer system.

In an embodiment, the Code-PE system 110 can further include a human-machine interface 118 (HMI) (e.g., a display, a graphical-user interface (GUI)) which can be configured to present various information including the semantic models 182A-n, dictionaries 183A-n, and/or corpora 184A-n, information regarding entities 186A-n (including typed strings 187A-n, untyped strings 188A-n, types 189A-n, and suchlike), patterns 125A-n, codes 135A-n, weights 140A-n, vectors 146A-n, and suchlike, per the various embodiments presented herein. The HMI 118 can include an interactive display 119 to present the various information via various screens presented thereon, and further configured to facilitate input of information/settings/etc., regarding the various embodiments presented herein regarding operation of the Code-PE system 110 and the inputs 180.

Using a Pattern to Type a Previously Untyped Entity

Figure 2A:
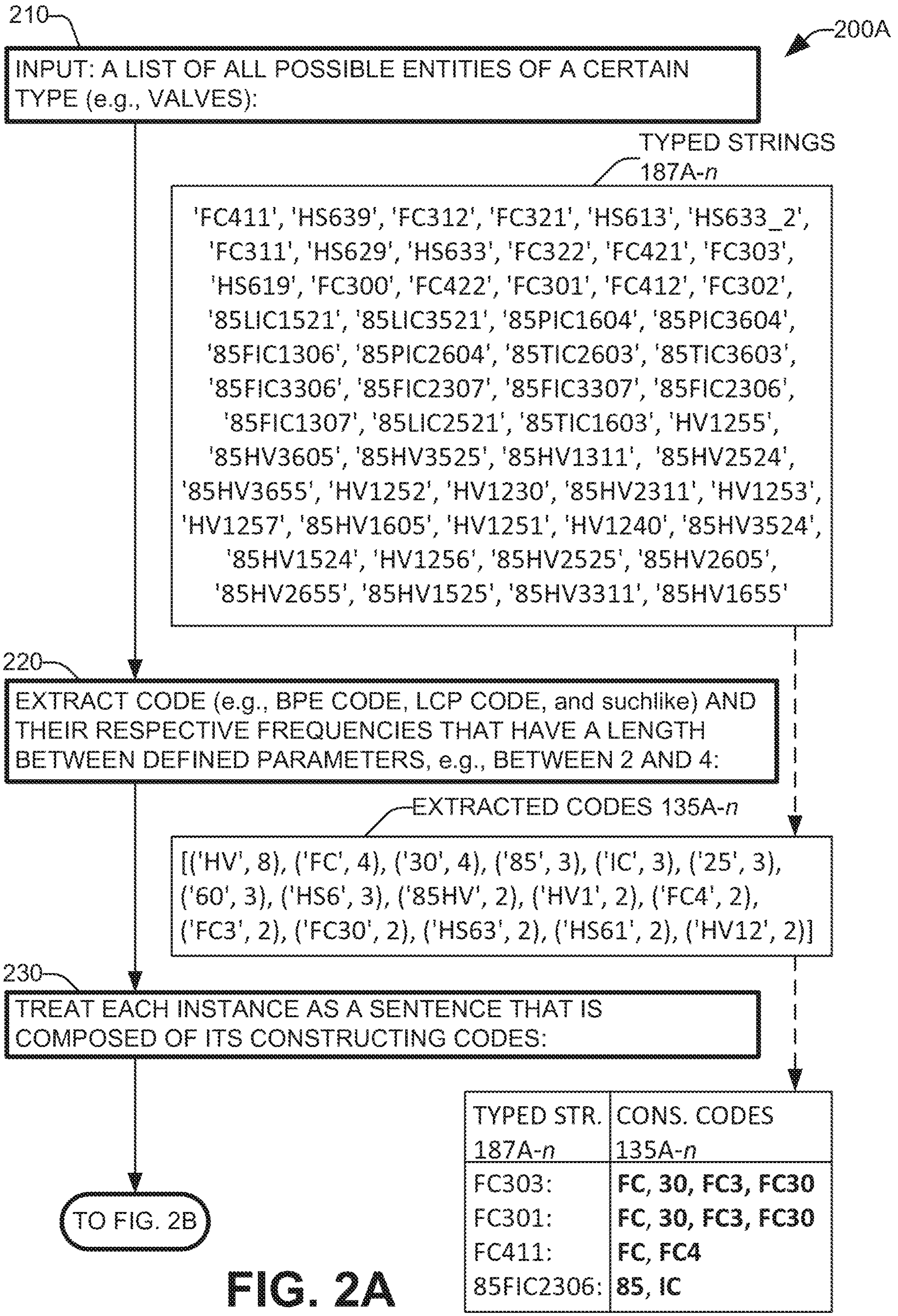
FIGS. 2A and 2B are schematics illustrating a computer-implemented methodology for code-based pattern extraction to identify entities, according to one or more embodiments.
Figure 2B:
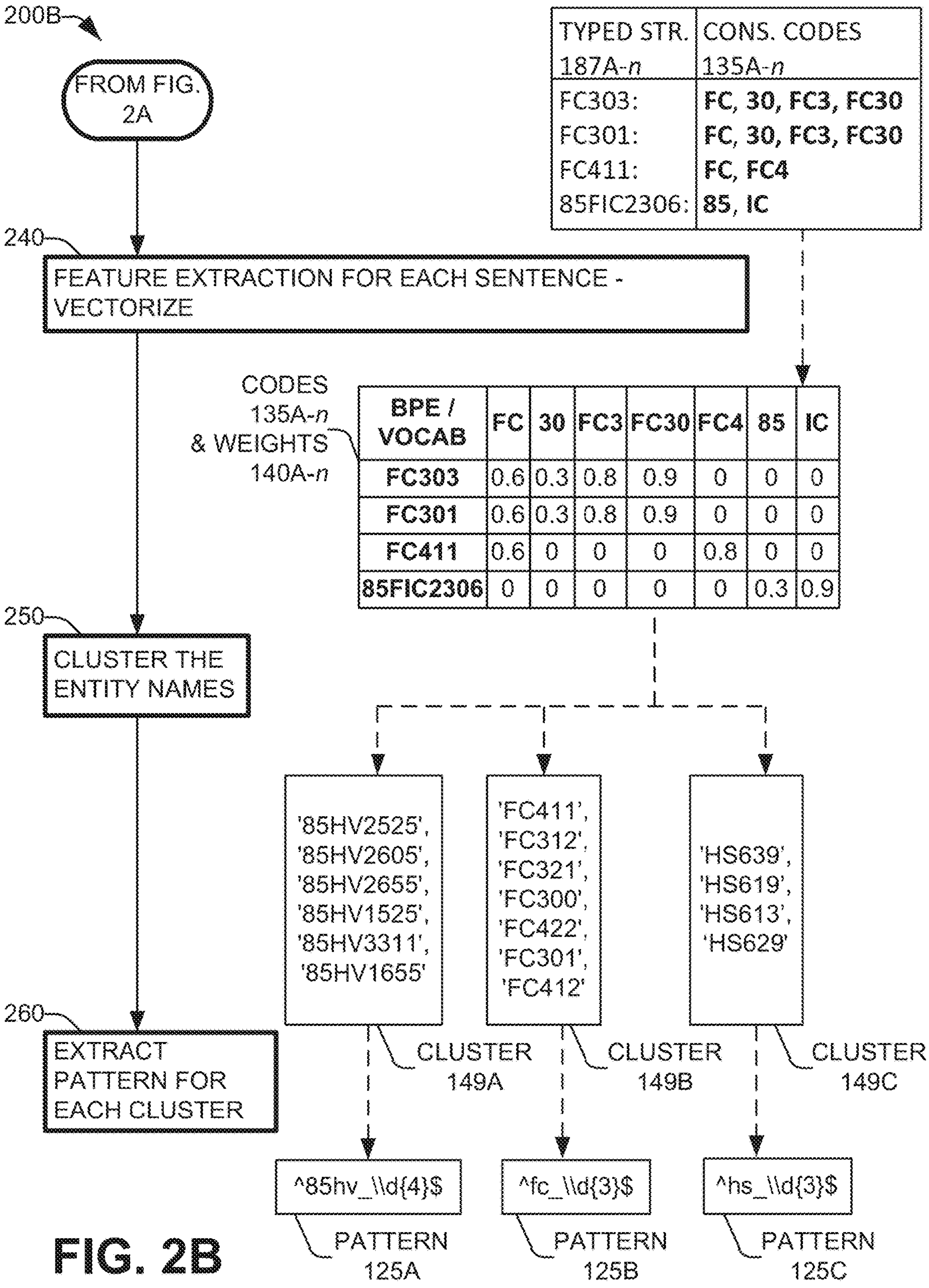

Turning to FIGS. 2A and 2B, schematics 200A and 200B illustrate a computer-implemented methodology for code-based pattern extraction to identify entities, according to one or more embodiments. Schematics 200A and 200B present various steps accompanied by an example of execution of the various steps, wherein the example execution utilizes example entities/subjects/strings/codes. However, it is to be appreciated that the examples presented in FIGS. 2A and 2B are simply examples and the various steps can be equally applied to any sample entities/subjects/strings/codes.

At 210, an input (e.g., input 180) is received (e.g., at the code-PE system 110) comprising a list of all possible entities 186A-n, wherein the entities have been predefined to be of a certain type (e.g., respective entities 186A-n have respective typed strings 187A-n). For example, the entities 186A-n can pertain to equipment located in a manufacturing plant, with available types such as pumps, valves, machines, PLCs, and suchlike. As shown in FIG. 2A, a series of typed strings 187A-n are submitted to the Code-PE system 110 which can respectively identify the various equipment and types defined for the entities 186A-n. The series of typed strings 187A-n contain a variety of values and formats, e.g., in a random selection, 'FC411', 'HS639', '85LIC1521', '85HV3524', and suchlike. Hence, it is apparent that there is a range of values and string lengths, however, there are common features that can be identified by the Code-PE system 110.

At 220, various codes 135A-n can be identified in the strings (e.g., by the code component 130), e.g., using BPE code extraction, LCP code extraction, and suchlike, and further various limits and ranges can be applied, e.g., codes 135A-n are limited to a length between 2 and 4 parameters. As further described, the frequency of occurrence of a code in codes 135A-n in the typed strings 187A-n can be determined. Example codes are presented under codes 135A-n, e.g., ('HV', 8), ('FC', 4), and suchlike.

At 230, each typed string 187A-n can be treated as a sentence, for which the respective occurrences of respective codes 135A-n can be identified (e.g., by the code component 130) in each sentence, the respective codes 135A-n can be considered as constructing cach typed strings 187A-n. For example, typed string 187T comprises the sentence 'FC303' which comprises codes 135A-n of 'FC', '30', 'FC3', 'FC30', while typed string 187U comprises the sentence '85FIC2306' which comprises codes '85', 'IC'.

Advancing to FIG. 2B, (wherein the constructing codes 135A-n are carried over from FIG. 2A for readability), at 240, feature extraction can be utilized (e.g., by any of the code component 130, the weight component 137, the vector component 144, or combination thereof) for each sentence using any suitable technique. In an embodiment, the respective sentence can be extracted using a vector technique (e.g., by vector component 144). In an embodiment, a Term Frequency-Inverse Document Frequency (TF-IDF) technique (e.g., by vector component 144) can be utilized to identify and rank codes 135A-n. e.g., based upon their frequency of appearance within the sentences of the typed strings 187A-n. The TF-IDF technique can vectorize (e.g., vectors 146A-n) the respective sentence (e.g., comprising the respective typed string in typed strings 187A-n) by applications of various weightings (e.g., by weights 140A-n). In an embodiment, a higher weighting/value can be applied (e.g., by the weight component 137) to less frequent/ rarer codes 135A-n. As shown in the example codes 135A-n and weightings 140A-n, respective typed strings 187A-n have been broken down based upon which codes (e.g., BPE codes) appear in the typed string 187A-n along with various applied weights 140A-n. For example, 'FC303' comprises codes 'FC' (with a weighting of 0.6), '30' (weighting=0.3), 'FC3' (weighting=0.8), 'FC30' (weighting=0.9). Hence, in an embodiment where higher weighting is applied (e.g., by the weight component 137) to rarer codes, the code 'FC30' is rarer and has a higher weighting applied than the code '30'. Further, 'FC303' does not include any of codes 'FC4', '85', or 'IC', accordingly, 'FC303' has weightings of 0 applied for these codes. Alternatively, 'FC411' only includes the codes 'FC' (weighting=0.6) and 'FC4' (weighting=0.8), while '85FIC2306' only includes the codes '85' (weighting=0.3) and 'IC' (weighting=0.9).

At 250, the respective entity names can be clustered (e.g., by cluster component 148) into respective clusters 149A-n, based upon the feature extraction method utilized. In an embodiment, where the TF-IDF technique was utilized to vectorize (e.g., in vectors 146A-n) the entity names, the entity names can be clustered based upon application of any suitable vector quantization technique. In an embodiment, the vector quantization technique can be k-means clustering.

At 260, a respective pattern (e.g., in patterns 125A-n) can be identified (e.g., by pattern component 120) for each respective cluster 149A-n. Continuing the example, cluster 149A comprises entities 186A-n having typed strings 187A-n that can be defined by pattern 125A: ^85hv_\\d{4}$, cluster 149B comprises entities 186A-n having typed strings 187A-n that can be defined by pattern 125B: ^fc_Id{3}$, and cluster 149C comprises entities 186A-n having typed strings 187A-n that can be defined by pattern 125C: ^hs_Id {3} $.

Per the foregoing, as presented in FIGS. 2A and 2B, the Code-PE system 110 can be successfully applied to a NER pipeline, to identify and classify entities 186A-n in a collection of unstructured identifiers (untyped strings 188A-n) based upon knowledge of entities 186A-n having typed strings 187A-n. Hence, per the presented example, a collection of patterns 125A-n can be extracted from a collection of equipment located in a manufacturing plant. Further, in the event that one or more of the entities 185A-n in a cluster 149A-n have already been assigned a type (e.g., identified with a typed string 187A-n), e.g., pump, valve, and suchlike, then it is possible to infer a type to an entity 186A-n that currently has not been assigned a type (untyped strings 188A-n).

As further described herein, the identified patterns (e.g., patterns 125A-n) can be applied to statements in a corpus (e.g., in corpus 184A-n), semantic models (e.g., semantic models 182A-n), and suchlike, wherein the patterns can be identified in the statements (e.g., by matching component 150), and based on the type assigned to the pattern, an entity can be typed (e.g., by matching component 150).

In response to an utterance "Show me all the pumps related to FC100", which, at the time of the utterance, the utterance has no context as there is no knowledge regarding the FC100 type, it is possible to infer the type. It is possible to refer to a dictionary (e.g., dictionary 183D) for FC100 and its assigned type, but if the dictionary does not have an entry identifying what the FC100 type is, then the dictionary is of no help. However, per the steps presented in FIGS. 2A and 2B, it is possible to identify patterns 125A-n, wherein the patterns are generated from entities that have been previously assigned a type. Accordingly, the type associated with the entities 186A-n included in the cluster 149A-n of typed strings 187A-n having the pattern 125A-n can be assigned (e.g., by either of the pattern component 120 and/or the matching component 150) to other currently untyped entities having a string identifier that matches the pattern 125A. For example, from the generated pattern 125A-n (generated per the foregoing) it is possible to infer FC100 to be a valve based on at least one other entity 186A-n having the same pattern 125A-n as FC100 being previously typed as a valve(s).

Code Customization

It is possible to utilize various resources (e.g., in inputs 180) to customize/apply context (e.g., a type) to a code 135A-n. For example, customized code can be obtained from:

a) a subject matter expert (SME) providing component identification and typing. e.g., in a piping and instrumentation diagram (P&ID) for a domain that includes pumps and valves.

b) a knowledge graph, such as at least one of semantic models 182A-n. For example, entities 'FC', 'FC1', 'FC2', 'FC3' are known entities (having been previously defined/associated with a typed string 187A-n) in the knowledge conveyed by a semantic model, such that entity 186H='FC1234' is typed (e.g., as typed string 187H) and thus codes 'FC' and 'FC1' can also be typed. Further, the physical proximity of entities in an organization (e.g., within a factory floor) can also provide an approach to create semantic meaning. For example, two entities 'FC123' and 'FC1234' are proximate to each other, wherein, as represented in a model (e.g., in a semantic model 182*n*, per FIG. 8), the two entities can be represented as nodes with a relationship established between them represented as an edge. Hence, information assigned to 'FC123' can be inferred to 'FC1234'. In a further embodiment, customized code can be based upon knowledge provided by an asset hierarchy. For example, from an asset hierarchy that includes entities 'FC1', 'FC2', and 'FC3', a code 'FC' can be derived.

In a further example, codes can be extracted from a string '85HV2598', wherein the codes 85HV25\d{2} or 85HV\d{4} both are equally applicable to the string and/or can be derived therefrom. In an embodiment, the actual code can depend upon which code is defined in a domain. For example, if a component is identified as '85HV25', that component is different from a component identified as '85HV'.

In a further example, assembly line 1 in a manufacturing plant has a component identified as 'abcd', while assembly line 9 has components 'abc' and 'efg'. A new component is added to line 1, component 'abcd123'. When initially analyzing the code, e.g., based upon BPE coding, the code 'abc' is determined to be most common. However, the coding based on BPE coding is subsequently deemed to be incorrect based upon reviewing entities proximate to the new component in a semantic graph, as previously mentioned.

Semantic Model and Recursive Updating

Figure 3:
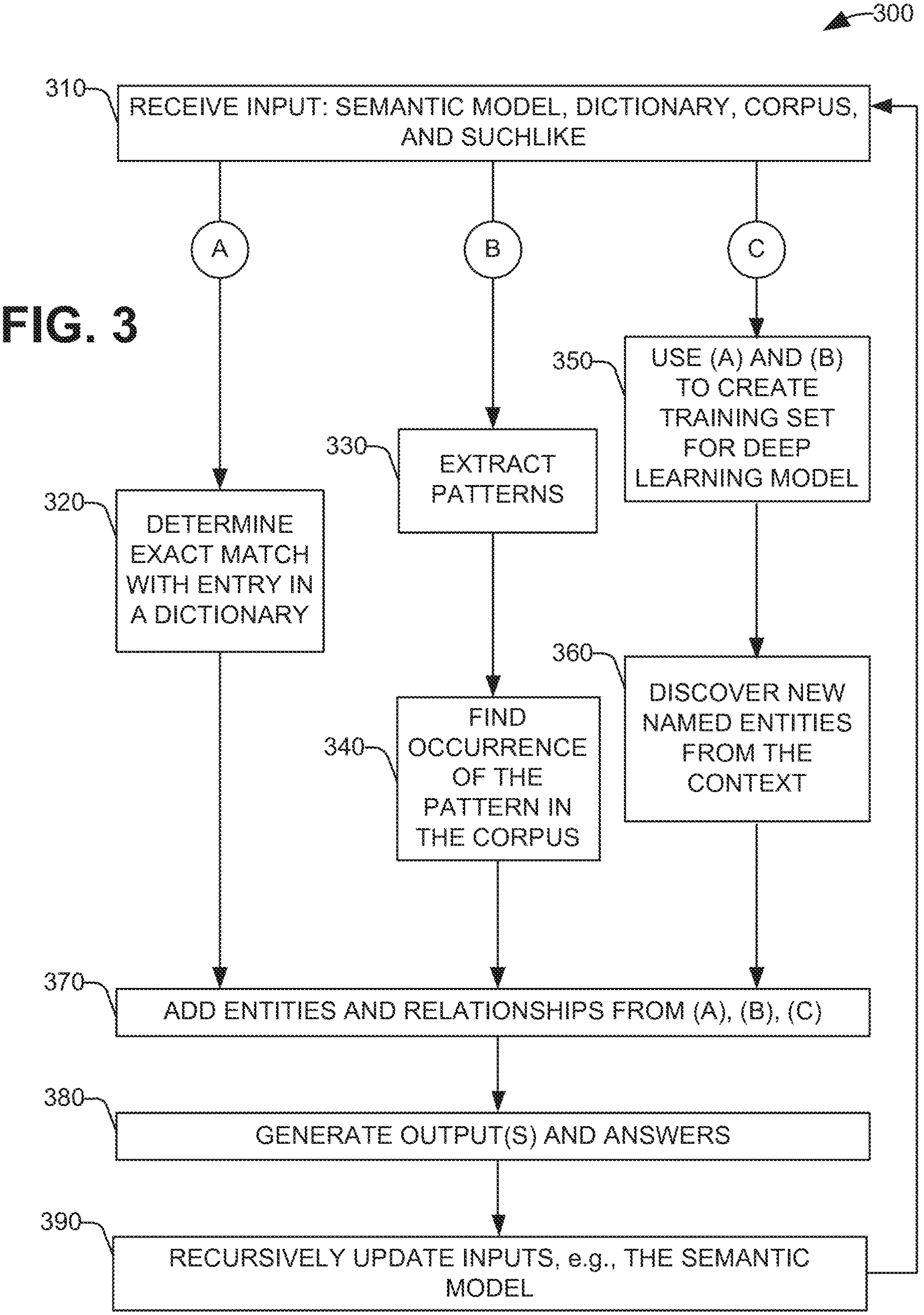
FIG. 3 presents a computer-implemented methodology/schematic regarding recursively updating various inputs based upon applying knowledge to entities, in accordance with an embodiment.
Figure 4:
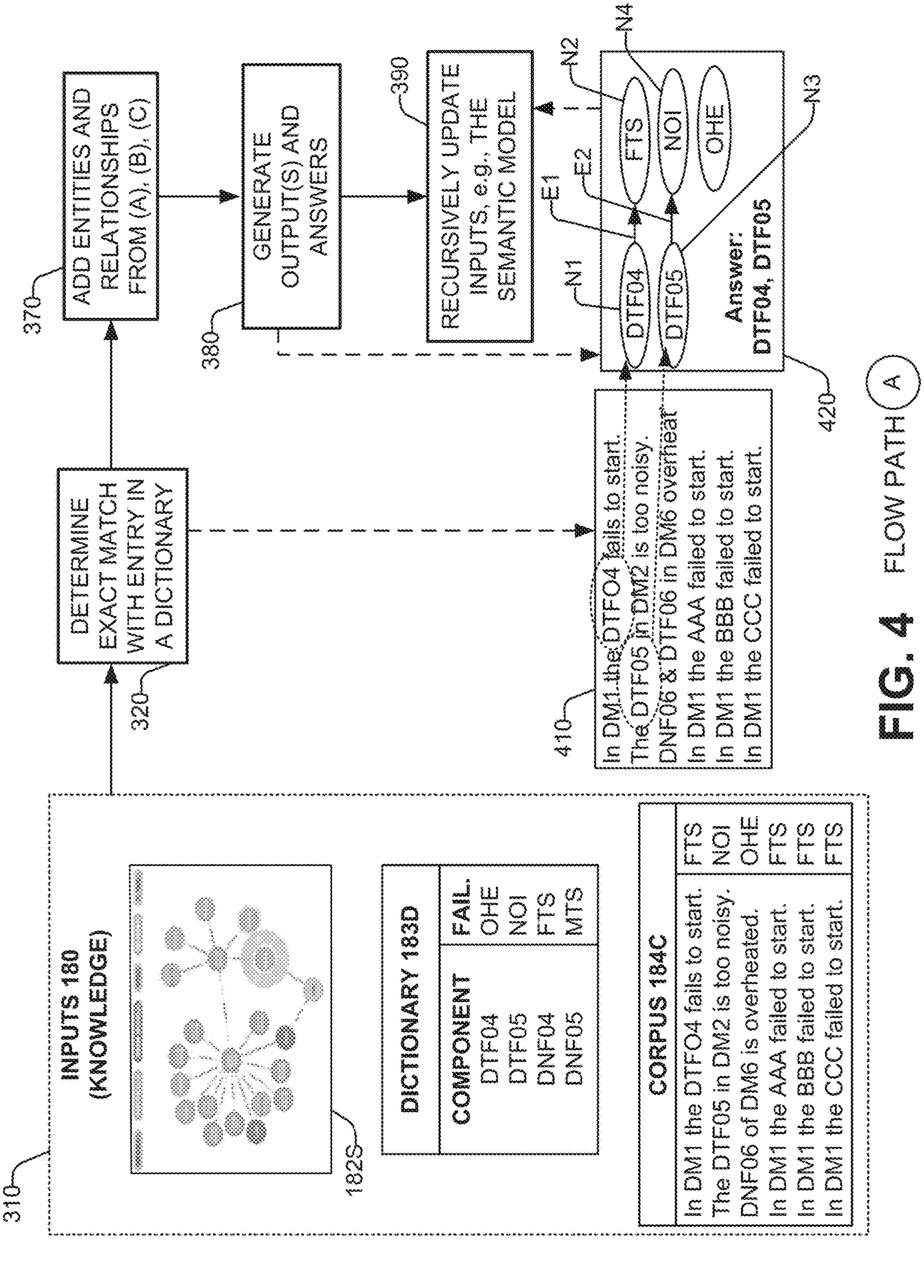
FIG. 4 presents a computer-implemented methodology/schematic of a flow path (A) for an exact match between an entity and a dictionary, with examples added, in accordance with one or more embodiments.
Figure 5:
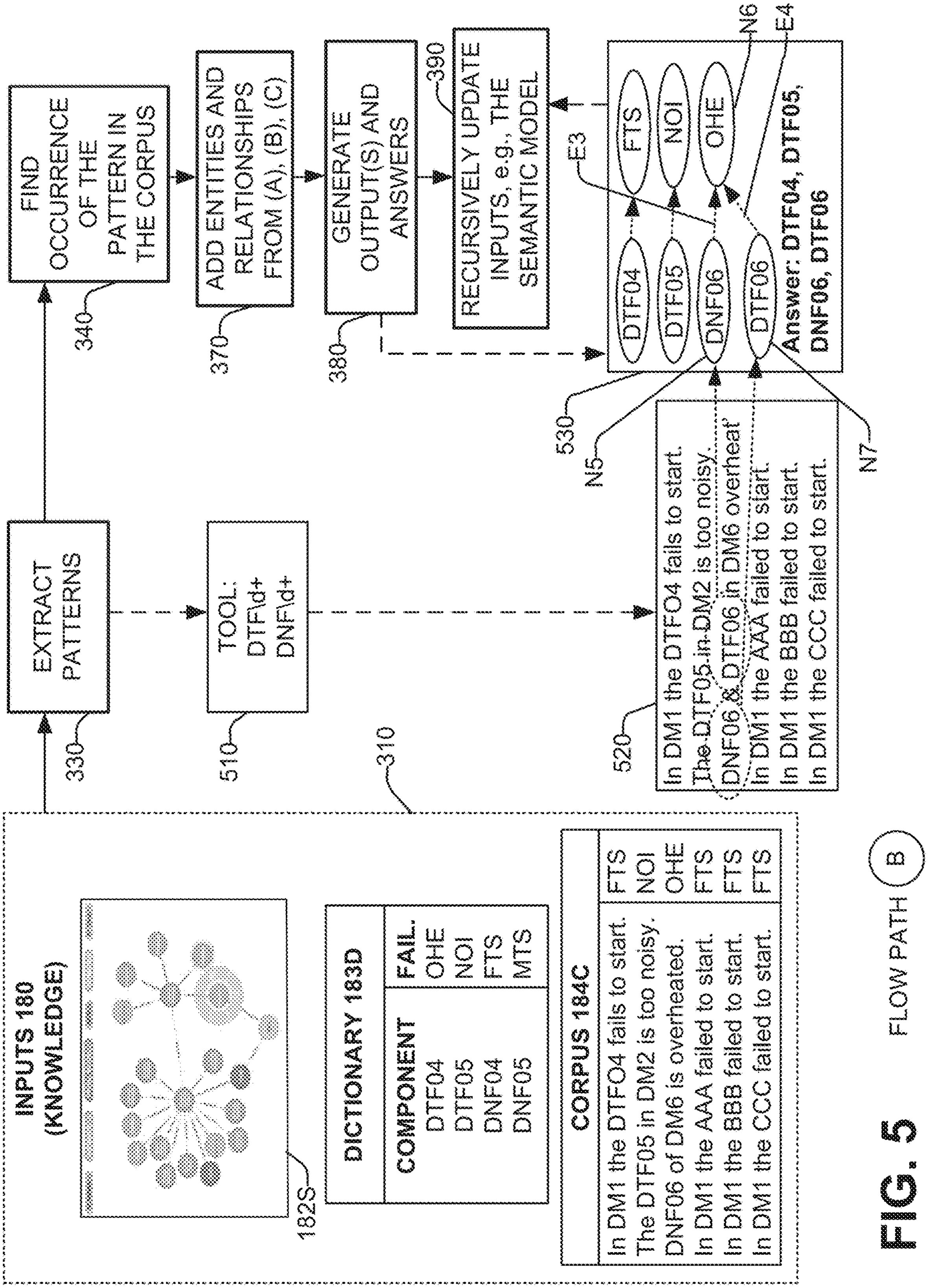
FIG. 5 presents a computer-implemented methodology/schematic of a flow path (B) with examples added, in accordance with one or more embodiments.
Figure 6:
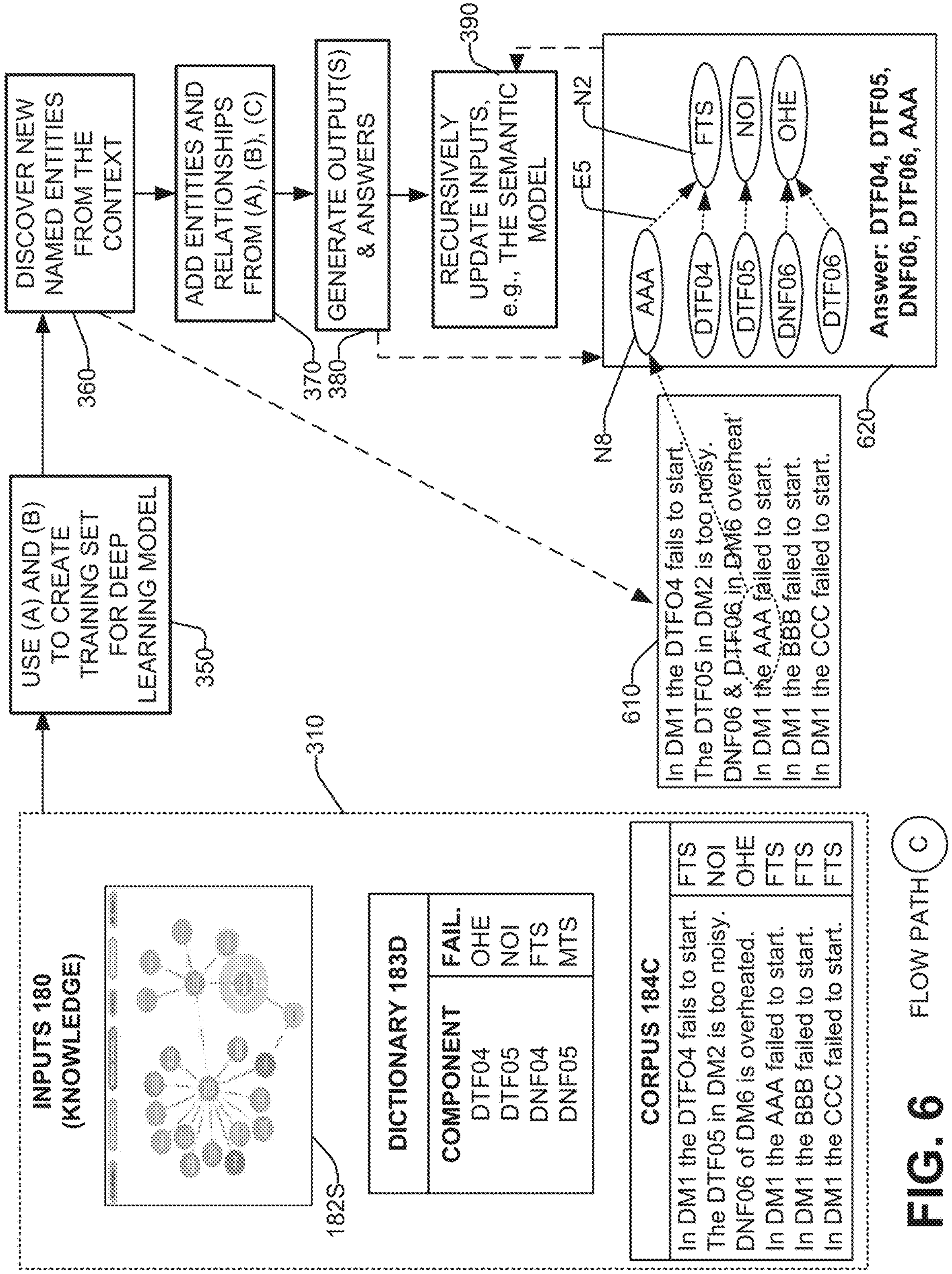
FIG. 6 presents a computer-implemented methodology/schematic of a flow path (C) with examples added, in accordance with one or more embodiments.

Turning to FIG. 3, methodology 300 is presented regarding recursively updating various inputs based upon applying knowledge to entities, in accordance with an embodiment. For the sake of understanding, various concepts are presented in FIG. 3 regarding three approaches (A), (B), and (C) that can be utilized, singly or in combination, to extract and type entities (e.g., any of entities 186A-n), while FIGS. 4-6 present further explanation of the respective approaches along with examples of application, where FIG. 4 further expands on (A) determining an exact match utilizing a dictionary, FIG. 5 further expands on (B) pattern extraction and application of a corpus, and FIG. 6 further expands on (C) application of known context to data to enable identification/typing of new entities.

At 310, various inputs (e.g., inputs 180) can be applied (e.g., to Code-PE system 110) from which entities (e.g., entities 186A-n) can be identified/extracted, along with using knowledge (e.g., previously applied typing) regarding an entity to (a) further type an untyped entity and/or (b) confirm a pattern is correctly identifying and extracting entities. Methodology 300 presents three possible ways in which an entity (e.g., any of entities 186A-n) can be extracted from an input (e.g., any of inputs 180, semantic models 182A-n, dictionaries 183A-n, and/or corpora 184A-n, and suchlike) and furthermore, how an entity can be typed.

Flow path (A) comprises step 320, wherein an entity 186A-n can be identified/typed in accordance with knowledge provided in a dictionary (e.g., dictionary 183J).

Flow path (B) comprises steps 330 and 340. At step 330, a pattern (e.g., in patterns 125A-n) can be generated from entities (e.g., any of entities 186A-n) and codes (e.g., any of respective codes 135A-n, using respective weights 140A-n, vectors 146A-n, and clusters 149A-n), as previously described with reference to FIG. 2. At step 340, the pattern can be identified in a corpus (e.g., in any of corpora 184A-n).

Flow path (C) comprises steps 350 and 360. At 350, knowledge generated and/or gathered during the performance of one or more operations described with regard to flow path (A) and/or flow path (B) can be utilized to create a training set for a deep learning model. At 360, new entities can be identified and/or discovered based upon the context generated from flow path (A) and/or flow path (B). In an embodiment, it is not required that an entity string exactly matches those found in a dictionary (e.g., per flow path (A)) or an extracted pattern (e.g., per flow path (B)), but it may be required that a similarity of context exists between known entities and an identified potential entity. Hence, with flow path (C), while an entity may not appear in a dictionary or a semantic model, by identifying the context, it is possible to identify that the entity is a specific type. For example, if an entity of interest has associated text "failed to start", that context can indicate the entity is a pump rather than a valve.

At 370, the various entities identified during any of the operations pertaining to flow paths (A), (B), and/or (C), and any determined relationships can be combined.

At 380, various outputs and answers can be generated, e.g., in response to a question "What type of entity is component XYZ?"

At 390, as mentioned, any knowledge generated by any of the operations associated with flow paths (A), (B), and/or (C) can be utilized to update (e.g., recursively) any existing models, data, etc. For example, a semantic model 182A can be a process layout diagram representing entities in a manufacturing plant, wherein the knowledge gained from the foregoing steps 310 to 380 can be utilized to update knowledge regarding the entities. In an embodiment, the updated semantic model 182A can be utilized to supplement the pattern recognition process described in FIGS. 2A-B.

Turning to FIG. 4, methodology 400 presents a schematic of the flow path (A) for an exact match between an entity and a dictionary, with examples added, in accordance with one or more embodiments.

At 310, the inputs (e.g., pre-existing knowledge in inputs 180) can be applied to the Code-PE system (e.g., Code-PE system 110), wherein the inputs can include a semantic model (e.g., model 182S), a dictionary (e.g., dictionary 183D), and/or a corpus (e.g., corpus 184C). As previously described, the semantic model can depict various entities (e.g., any of entities 186A-n) as nodes, whereby the nodes can be further colored (or any other suitable means for depicting respective knowledge) to illustrate knowledge regarding cach entity (e.g., knowledge regarding type identified in respective typed strings 187A-n) in conjunction with edges connecting nodes, indicating, for example further knowledge regarding an entity. Another input can be a dictionary, for example, listing respective components and also failure modes/issues. E.g., OHE=overheated, NOI=noisy operation, FTS=failed to start, etc., while four components are listed, DTFO4, DTFO5, DNFO4, DNFO5. A further input can be a corpus which, per the examples herein, can present a collection of statements, text, speech, etc., regarding an entity, the location of the entity, and operational issue. In the corpus, statements are presented, such as "In DM1 the DTFO4 fails to start" indicating that in assembly line DM1, entity DTFO4 had a FTS failure. Such statements can be compiled from any applicable resources such as emails, maintenance reports, recordings of technical support calls, and suchlike.

At 320, an exact match can be determined (e.g., by matching component 150) between statements in the corpus and terms in the dictionary. For example, at 410, entity DTFO4 is identified (node N1) and associated with FTS (node N2 via edge E1), while entity DTFO5 is identified (node N3) and associated with NOI (node N4 via edge E2). Accordingly, as shown, nodes and edges are being generated to update the semantic model with.

Turning to FIG. 5, methodology 500 presents a schematic of the flow path (B) with examples added, in accordance with one or more embodiments.

At 310, as previously described (per FIGS. 3 and 4) the inputs (e.g., pre-existing knowledge in inputs 180) can be applied to the Code-PE system (e.g., Code-PE system 110), wherein the inputs can include a semantic model (e.g., model 182S), a dictionary (e.g., dictionary 183D), and/or a corpus (e.g., corpus 184C).

At 330, various patterns (e.g., one or more patterns in patterns 125A-n) can be generated from the various inputs 180, as previously described with reference to FIGS. 2A and 2B. As shown at 510, examples tool pattern formats can be DTF\d+ and DNF\d+, generated using the combination of coding, weighting, and vectorization operations presented in FIGS. 2A and 2B.

At 340, the one or more patterns generated at step 330 can be identified in the corpus. For example, at 520 and 530, entity DNFO6 is identified (node N5) and associated with OHE failure (node N6 via edge E3), while entity DTFO6 is identified (node N7) and also associated with OHE failure (node N6 via edge E4). Accordingly, as shown at 370, 380, 390, further nodes and edges are being outputted/supplemented to those identified per FIG. 4, to further update the semantic model with.

Turning to FIG. 6, methodology 600 presents a schematic of the flow path (C) with examples added, in accordance with one or more embodiments.

At 310, as previously described (per FIGS. 3 and 4) the inputs (e.g., pre-existing knowledge in inputs 180) can be applied to the Code-PE system (e.g., Code-PE system 110), wherein the inputs can include a semantic model (e.g., model 182S), a dictionary (e.g., dictionary 183D), and/or a corpus (e.g., corpus 184C).

As previously mentioned, at 350, knowledge generated and/or gathered during the performance of one or more operations described with regard to flow path (A) and/or flow path (B) can be utilized to create a training set for a deep learning model. At 360, new entities can be identified and/or discovered based upon the context generated from flow path (A) and/or flow path (B).

At 610, a new entity AAA is identified with a failure mode of failed to start (FTS). FTS is a context that can be utilized to identify a pump, accordingly, it can be implied that AAA is a pump even though AAA is not defined in the semantic model or the dictionary.

At 370, 380, and 390, the new entity AAA (node N8) can be connected to the FTS failure mode (node N2 via edge E5), per answers compiled at 620.

Accordingly, as shown, by the various operations presented in FIGS. 3-6, the sematic model can be updated to include the newly identified entities AAA, DTFO4, DTFO5, DNFO6, and DTFO6, with respective failure modes FTS, NOI, OHE.

Per the example presented in the foregoing, by recursively updating the semantic model 182S, with new entity AAA being defined, upon subsequently repeating the operations with an existing corpus (e.g., corpus 184C) and/or a new corpus (e.g., corpus 184N), where, for example, the new corpus includes entities AAA8, AAA10, and AAA15, in response to entity AAA has been added as a new component in the sematic model, there is now a high probability that AAA8, AAA10, AAA15 will be subsequently identified based on AAA being identified in the latest iteration of the NER pipeline.

Pattern Confirmation

Figure 7:
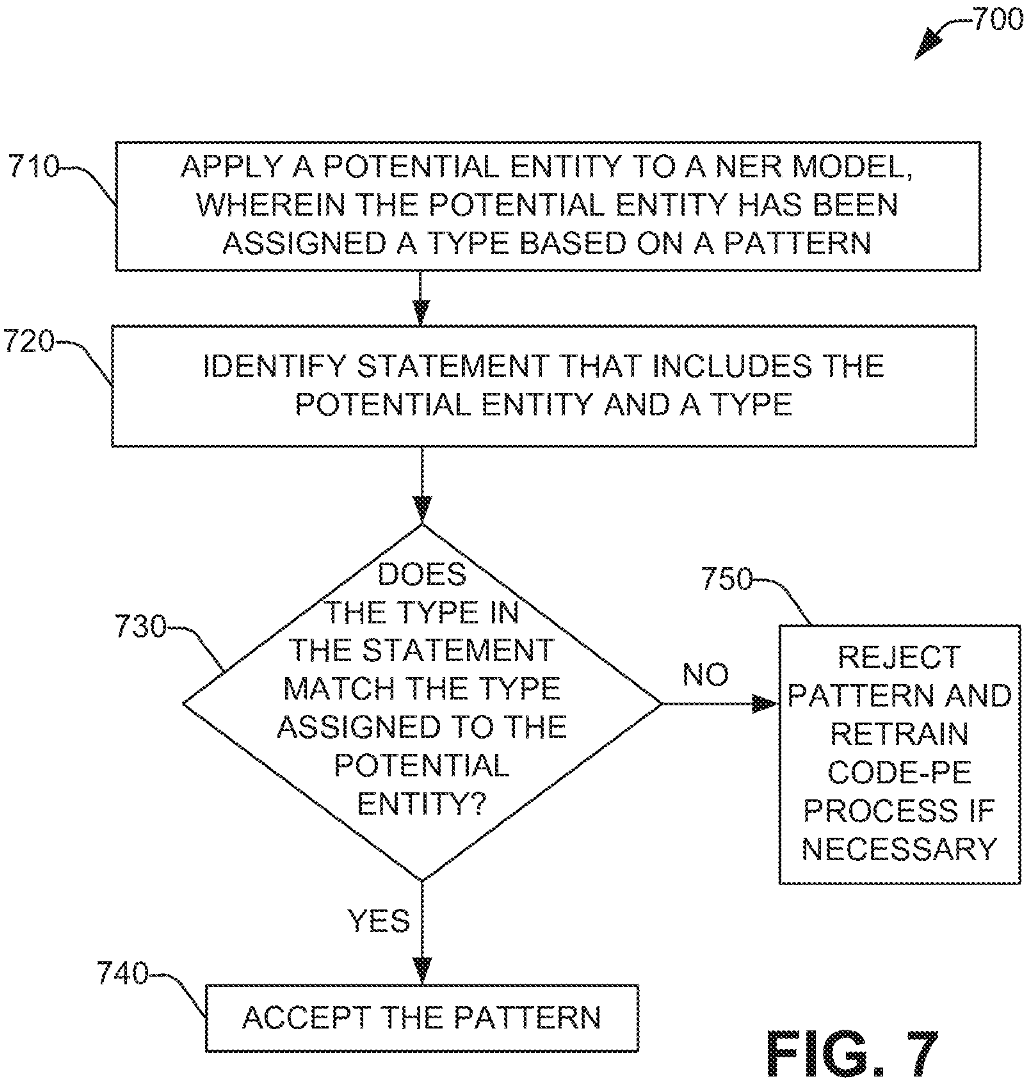
FIG. 7 illustrates a computer-implemented methodology for confirming a pattern generated using the Code-based pattern extraction system, in accordance with one or more embodiments.

FIG. 7 illustrates a computer-implemented methodology 700 for confirming a code and pattern generated using the Code-based pattern extraction system, in accordance with one or more embodiments. As previously described, a domain NER model 185 (e.g., utilized in conjunction with the Code-PE system 110) can be utilized to generate one or more patterns 125A-n based upon input of entities 186A-n which were supplied with typed strings 187A-n.

To confirm that any of a pattern, code, and/or type was correctly generated (per FIGS. 2A and 2B) a pattern can be applied to the NER model 185 presented in FIGS. 3-6. In an embodiment, the NER model 185 can be updated with at least one of a new corpus, a new dictionary, etc. Further, in another embodiment, the NER model 185 can be utilized to identify a pattern is correctly identified based upon a type being entered into the NER model 185 and any patterns/entities identified for the type can be extracted for review, e.g., to determine if the pattern recognition process is correctly identifying all of the entities having the entered type.

In an example scenario, for an initially untyped entity (e.g., entity 186K having untyped string 188K) that was subsequently identified and typed (e.g., with a typed string 187K) using the Code-PE system 110 and patterns 125A-n, confidence in the Code-PE system 110 can be enhanced by applying a newly typed entity to the NER model. As mentioned, the NER model comprises readily available information (e.g., in any of semantic models 182A-n, dictionaries 183A-n, and/or corpora 184A-n, and suchlike). Hence, the information in the NER model can be utilized to confirm an ability of a pattern (e.g., any of patterns 125A-n) to correctly identify and type a previously unknown entity and/or an entity that was previously untyped.

At 710, an entity that has been identified and typed by a pattern (e.g., any of patterns 125A-n) can be applied to the NER model.

At 720, the knowledge included in the NER model can be analyzed to determine an occurrence of the entity (e.g., entity 186K being assigned a typed string 187K) and any further information (e.g., in any of semantic models 182A-n, dictionaries 183A-n, and/or corpora 184A-n, and suchlike) that can provide further context regarding what type should be assigned to the entity. For example, a pattern 85V\d{4} (e.g., gencrated per the methodology of FIGS. 2A-2B) has an assigned entity type=valve, and when the pattern is applied to a corpus, the following string '85V2594' is identified and extracted from the corpus. However, simply based upon the corpus, it is not possible to confirm whether the extracted string is correct regarding the entity being a valve or some other type of component, e.g., a pump, PLC, and suchlike. Hence, to confirm integrity/accuracy of the Code-PE system and the generation and application of found patterns, further information regarding the entity and string '85V2594' is required.

Based on analysis of the corpus, a first sentence is identified which comprises: "In pumpA the 85V25 was not working properly."

At 730, a determination (e.g., by matching component 150) can be made regarding whether the information in the statement (e.g., in the first sentence) matches the type assigned to the entity by the pattern recognition process. Per the first sentence, it is possible to imply that '85V25' is a component of 'pumpA', hence NER pipeline identifies '85V25' to be a 'valve'. With a response of YES the type assigned to the entity matches the type in the statement, methodology 700 can advance to 740 and the pattern is accepted, in conjunction with the entity and the type that was assigned to the entity by the pattern recognition process. Hence, the pattern can be accepted and the type for '85V25' can be identified as a 'valve'.

Returning to 720, a second sentence is identified which comprises the following: "85V25 is working on it." However, a NER pipeline recognizes the string '85V2594' to be an employee identification (ID).

Advancing to 730 for the second sentence, a response is generated that NO the type in the statement (e.g., the second sentence) does not match the type applied by the pattern recognition process. A mismatch exists between the pattern having a type='valve', while the NER pipeline indicates the string to have a type='employee ID'.

At 750, given the mismatch between the two identified types, the pattern should be rejected. In an embodiment, the pattern recognition process that generated the pattern having a mismatch with the information in the NER pipeline can be reviewed to determine why the pattern is incorrectly typing entities, with further training of the pattern to be performed as deemed necessary to improve the pattern recognition (e.g., with any newly available data, entity types, and suchlike).

It is to be appreciated that any number of sentences can be utilized to determine whether a pattern is correct or is to be rejected, e.g., two sentences indicate that a string pertains to a pump, while a third sentence indicates the string pertains to an employee. Given the mismatch across the three sentences, the pattern is initially rejected with further investigation being required.

FIG. 8, schematic 800, presents a semantic model to convey various concepts presented herein in accordance with at least one embodiment. FIG. 8 presents a semantic model 182*n* which depicts various entities located in a 1st manufacturing plant and a 2nd manufacturing plant. Each plant comprises various entities depicted as a "typed node V" (the entity has been typed as a valve), "typed node P" (the entity has been typed as a pump), and "untyped node" (the entity has yet to be identified/assigned a type). Nodes can be connected by edges indicating a relation of one node to a proximate node or a node located further away. As previously mentioned, the probability that two proximate entities (e.g., within the same factory) having a similar pattern are likely to be similar devices (e.g., pumps) than the probability of two entities that are distant (e.g., in different factories) are similar devices even though their identifier strings are similar.

Further, the identifiers (strings) utilized to identify components in the 1$^{st}$ plant may not be configured according to the same identification system utilized in the 2$^{nd}$ plant, hence the unbroken edge 810 indicating that the identification system of the 1$^{st}$ plant cannot be automatically applied to the 2$^{nd}$ plant (possibly further confirmation is required before definitively typing a component, e.g., by reviewing content in a corpus (e.g., any corpora 184A-n) pertaining to the plant. As described with reference to FIG. 7, the 2$^{nd}$ plant may be using a particular identifier string as an employee ID, accordingly an edge that was defined as being an edge connecting a node identified as a valve is rejected at 820.

Further, an edge may not be fully defined within a plant owing to the respective node being an untyped node. Accordingly, while a component may be associated with another component, the edge cannot be defined as one of the components is still to be identified and typed, e.g., edge 830 is not fully defined as node 840 is in an untyped state even though both nodes 850 and 860 have been typed as pumps. A different edge representation can be utilized between typed but different entities. For example, edge 870 that connects the typed node P 850 to the typed node V 880 has a different format to the edge 890 connecting the P-typed nodes 850 and 860.

As previously described (e.g., per FIG. 4, 420; FIG. 5, 530; and FIG. 6, 620) as various components are typed and other information becomes available, the respective nodes and edges in a semantic model (e.g., any of semantic models 182A-n) can be updated to reflect the new knowledge.

Figure 9:
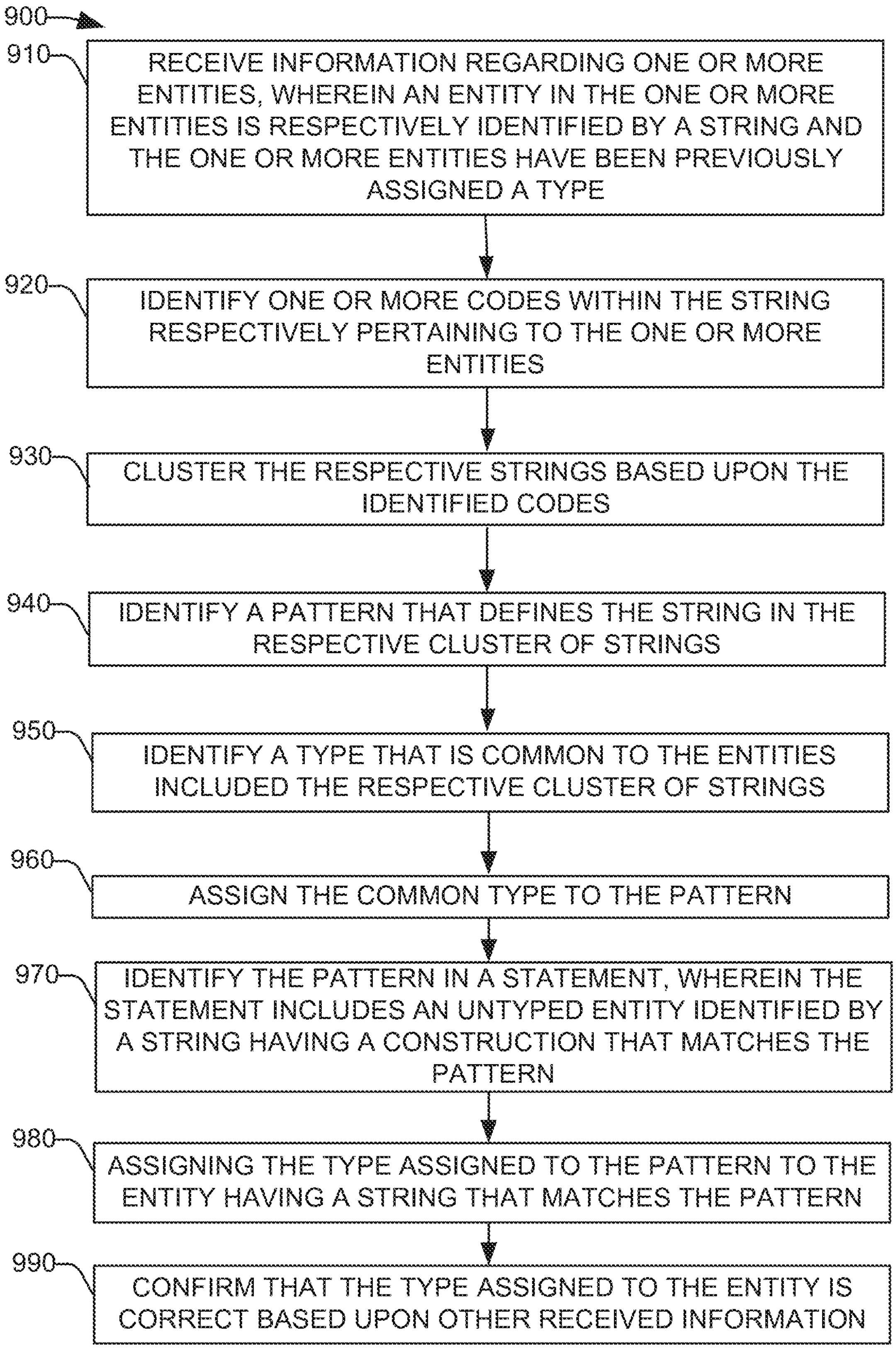
FIG. 9 presents a computer-implemented methodology for identifying a pattern and assigning a type to an entity having an identifier matching the pattern, based on the type previously assigned to the pattern, in accordance with one or more embodiments

FIG. 9 presents a computer-implemented methodology 900 for identifying a pattern and assigning a type to an entity having an identifier matching the pattern, based on the type previously assigned to the pattern, in accordance with one or more embodiments.

At 910, the computer-implemented method can comprise receiving at a Code-PE system (e.g., via I/O 116 at Code-PE system 110) information regarding one or more entities (e.g., entities 186A-n), wherein an entity in the one or more entities is respectively identified by a string, and further, the one or more entities have been assigned a type (e.g., a pump, valve, and suchlike in types 189A-n). Accordingly, the one or more entities that have been assigned a type, their respective identifier string can be considered to be a typed string, e.g., a first set of entities in the information can be previously assigned a first type (e.g., typed strings 187P=pumps), while a second set of entities in the information can be previously assigned a second type (e.g., typed strings 187V=valves), a third set of entities in the information can be previously assigned a third type (e.g., typed strings 187L=PLCs), and suchlike.

At 920, as previously described, one or more codes can be identified (e.g., by code component 130) within the respective typed strings (e.g., typed strings 187P, 187V, 187L).

At 930, as previously described, the respective typed strings can be clustered (e.g., by cluster component 148) based on any suitable clustering technique. For example, weights (e.g., weights 140A-n) and vectors (e.g., vectors 146A-n) can be applied (e.g., respectively by weight component 137 and vector component 144) to the typed strings to cluster the respective strings having similar structure.

At 940, for each cluster, a pattern (e.g., in patterns 125A-n) can be identified (e.g., by pattern component 120) that defines the strings in the cluster.

At 950, for each cluster, the type that was previously assigned to the respective entities in the respective cluster can be identified (e.g., by the pattern component 120).

At 960, the type identified for the cluster can be assigned (e.g., by the pattern component 120) to the pattern that represents the cluster.

At 970, a pattern can be identified in information further provided to the Code-PE system. The information can be included in any source (e.g., in one or more semantic models 182A-n, in one or more dictionaries 183A-n, in various corpus 184A-n). As previously described, an entity associated with the pattern can be untyped with regard to what the entity is, e.g., it has not been previously assigned as a valve, a pump, etc. Hence, the string associated with the entity is an untyped string 188A-n.

At 980, as previously described, based on the type being identified/assigned to the pattern, the entity can be assigned the type associated with the pattern and accordingly, the type can be assigned to the entity (e.g., by pattern component 120) such that the entity now has a typed string 187A-n associated therewith.

At 990, as previously described (per FIG. 7), the system (e.g., Code-PE system 110) can be further review (e.g., by matching component 150) the various inputs (e.g., in inputs 180, such as in the one or more semantic models 182A-n, in one or more dictionaries 183A-n, in various corpus 184A-n) whether a context provided in the various inputs matches the type assigned to the untyped entity by the pattern, and (a) in response to a determination (e.g., by matching component 150) that the context matches the type assigned by the pattern to the untyped entity, retaining the pattern or (b) in response to determining (e.g., by matching component 150) that the context does not match the type assigned by the pattern to the untyped entity, discarding the pattern and removing the type assigned by the pattern

Example Applications and Use

Figure 10:
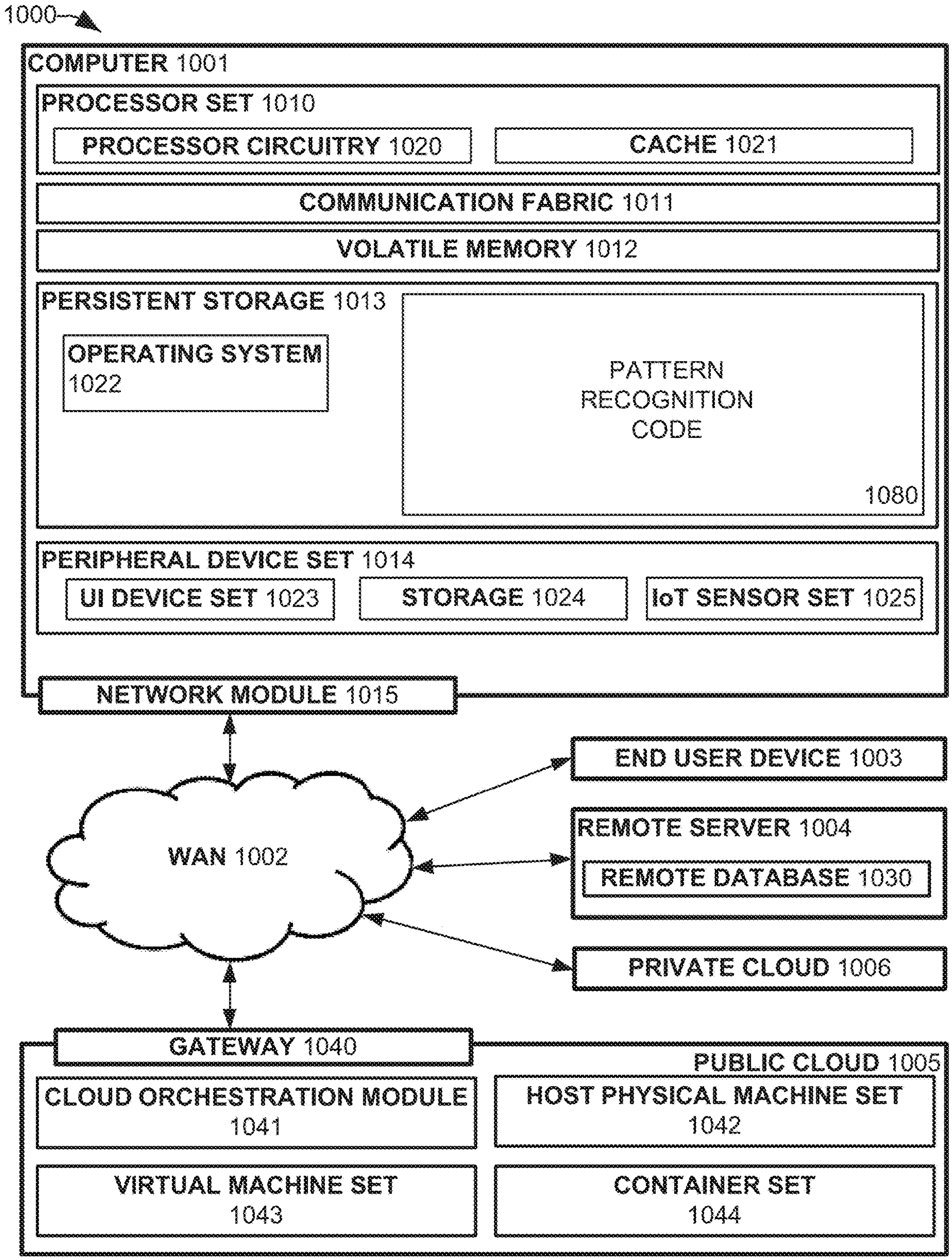
FIG. 10 depicts an example schematic block diagram of a computing environment with which the disclosed subject matter can interact/be implemented at least in part, in accordance with various aspects and implementations of the subject disclosure.

FIG. 10 and the following discussion are intended to provide a brief, general description of a suitable computing environment 1000 in which one or more embodiments described herein at FIGS. 1-9 can be implemented. For example, various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks can be performed in reverse order, as a single integrated step, concurrently or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium can be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include diskette, hard disk, random access memory (RAM), read-only memory (ROM), erasable programmable read-only memory (EPROM or Flash memory), static random-access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 1000 contains an example of an environment for the execution of at least some of the computer code involved in performing the inventive methods, such as pattern recognition within an entity identifier and extracted codes by the pattern recognition code 1080. In addition to block 1080, computing environment 1000 includes, for example, computer 1001, wide area network (WAN) 1002, end user device (EUD) 1003, remote server 1004, public cloud 1005, and private cloud 1006. In this embodiment, computer 1001 includes processor set 1010 (including processing circuitry 1020 and cache 1021), communication fabric 1011, volatile memory 1012, persistent storage 1013 (including operating system 1022 and block 1080, as identified above), peripheral device set 1014 (including user interface (UI), device set 1023, storage 1024, and Internet of Things (IOT) sensor set 1025), and network module 1015. Remote server 1004 includes remote database 1030. Public cloud 1005 includes gateway 1040, cloud orchestration module 1041, host physical machine set 1042, virtual machine set 1043, and container set 1044.

COMPUTER 1001 can take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 1030. As is well understood in the art of computer technology, and depending upon the technology, performance of a computer-implemented method can be distributed among multiple computers and/or between multiple locations. On the other hand, in this presentation of computing environment 1000, detailed discussion is focused on a single computer, specifically computer 1001, to keep the presentation as simple as possible. Computer 1001 can be located in a cloud, even though it is not shown in a cloud in FIG. 10. On the other hand, computer 1001 is not required to be in a cloud except to any extent as can be affirmatively indicated.

PROCESSOR SET 1010 includes one, or more, computer processors of any type now known or to be developed in the future. Processing circuitry 1020 can be distributed over multiple packages, for example, multiple, coordinated integrated circuit chips. Processing circuitry 1020 can implement multiple processor threads and/or multiple processor cores. Cache 1021 is memory that is located in the processor chip package(s) and is typically used for data or code that should be available for rapid access by the threads or cores running on processor set 1010. Cache memories are typically organized into multiple levels depending upon relative proximity to the processing circuitry. Alternatively, some, or all, of the cache for the processor set can be located "off chip." In some computing environments, processor set 1010 can be designed for working with qubits and performing quantum computing.

Computer readable program instructions are typically loaded onto computer 1001 to cause a series of operational steps to be performed by processor set 1010 of computer 1001 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 1021 and the other storage media discussed below. The program instructions, and associated data, are accessed by processor set 1010 to control and direct performance of the inventive methods. In computing environment 1000, at least some of the instructions for performing the inventive methods can be stored in block 1080 in persistent storage 1013.

COMMUNICATION FABRIC 1011 is the signal conduction path that allows the various components of computer 1001 to communicate with each other. Typically, this fabric is made of switches and electrically conductive paths, such as the switches and electrically conductive paths that make up busses, bridges, physical input/output ports and the like. Other types of signal communication paths can be used, such as fiber optic communication paths and/or wireless communication paths.

VOLATILE MEMORY 1012 is any type of volatile memory now known or to be developed in the future. Examples include dynamic type random access memory (RAM) or static type RAM. Typically, the volatile memory is characterized by random access, but this is not required unless affirmatively indicated. In computer 1001, the volatile memory 1012 is located in a single package and is internal to computer 1001, but, alternatively or additionally, the volatile memory can be distributed over multiple packages and/or located externally with respect to computer 1001.

PERSISTENT STORAGE 1013 is any form of non-volatile storage for computers that is now known or to be developed in the future. The non-volatility of this storage means that the stored data is maintained regardless of whether power is being supplied to computer 1001 and/or directly to persistent storage 1013. Persistent storage 1013 can be a read only memory (ROM), but typically at least a portion of the persistent storage allows writing of data, deletion of data and re-writing of data. Some familiar forms of persistent storage include magnetic disks and solid-state storage devices. Operating system 1022 can take several forms, such as various known proprietary operating systems or open-source Portable Operating System Interface type operating systems that employ a kernel. The code included in block 1080 typically includes at least some of the computer code involved in performing the inventive methods.

PERIPHERAL DEVICE SET 1014 includes the set of peripheral devices of computer 1001. Data communication connections between the peripheral devices and the other components of computer 1001 can be implemented in various ways, such as Bluetooth connections, Near-Field Communication (NFC) connections, connections made by cables (such as universal serial bus (USB) type cables), insertion type connections (for example, secure digital (SD) card), connections made though local area communication networks and even connections made through wide area networks such as the internet. In various embodiments, UI device set 1023 can include components such as a display screen, speaker, microphone, wearable devices (such as goggles and smart watches), keyboard, mouse, printer, touchpad, game controllers, and haptic devices. Storage 1024 is external storage, such as an external hard drive, or insertable storage, such as an SD card. Storage 1024 can be persistent and/or volatile. In some embodiments, storage 1024 can take the form of a quantum computing storage device for storing data in the form of qubits. In embodiments where computer 1001 is required to have a large amount of storage (for example, where computer 1001 locally stores and manages a large database) then this storage can be provided by peripheral storage devices designed for storing large amounts of data, such as a storage area network (SAN) that is shared by multiple, geographically distributed computers. IoT sensor set 1025 is made up of sensors that can be used in Internet of Things applications. For example, one sensor can be a thermometer and another sensor can be a motion detector.

NETWORK MODULE 1015 is the collection of computer software, hardware, and firmware that allows computer 1001 to communicate with other computers through WAN 1002. Network module 1015 can include hardware, such as modems or Wi-Fi signal transceivers, software for packetizing and/or de-packetizing data for communication network transmission, and/or web browser software for communicating data over the internet. In some embodiments, network control functions and network forwarding functions of network module 1015 are performed on the same physical hardware device. In other embodiments (for example, embodiments that utilize software-defined networking (SDN)), the control functions and the forwarding functions of network module 1015 are performed on physically separate devices, such that the control functions manage several different network hardware devices. Computer readable program instructions for performing the inventive methods can typically be downloaded to computer 1001 from an external computer or external storage device through a network adapter card or network interface included in network module 1015.

WAN 1002 is any wide area network (for example, the internet) capable of communicating computer data over non-local distances by any technology for communicating computer data, now known or to be developed in the future. In some embodiments, the WAN can be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 1003 is any computer system that is used and controlled by an end user (for example, a customer of an enterprise that operates computer 1001) and can take any of the forms discussed above in connection with computer 1001. EUD 1003 typically receives helpful and useful data from the operations of computer 1001. For example, in a hypothetical case where computer 1001 is designed to provide a recommendation to an end user, this recommendation would typically be communicated from network module 1015 of computer 1001 through WAN 1002 to EUD 1003. In this way, EUD 1003 can display, or otherwise present, the recommendation to an end user. In some embodiments, EUD 1003 can be a client device, such as thin client, heavy client, mainframe computer and/or desktop computer.

REMOTE SERVER 1004 is any computer system that serves at least some data and/or functionality to computer 1001. Remote server 1004 can be controlled and used by the same entity that operates computer 1001. Remote server 1004 represents the machine(s) that collect and store helpful and useful data for use by other computers, such as computer 1001. For example, in a hypothetical case where computer 1001 is designed and programmed to provide a recommendation based on historical data, then this historical data can be provided to computer 1001 from remote database 1030 of remote server 1004.

PUBLIC CLOUD 1005 is any computer system available for use by multiple entities that provides on-demand availability of computer system resources and/or other computer capabilities, especially data storage (cloud storage) and computing power, without direct active management by the scale. The direct and active management of the computing resources of public cloud 1005 is performed by the computer hardware and/or software of cloud orchestration module 1041. The computing resources provided by public cloud 1005 are typically implemented by virtual computing environments that run on various computers making up the computers of host physical machine set 1042, which is the universe of physical computers in and/or available to public cloud 1005. The virtual computing environments (VCEs) typically take the form of virtual machines from virtual machine set 1043 and/or containers from container set 1044. It is understood that these VCEs can be stored as images and can be transferred among and between the various physical machine hosts, either as images or after instantiation of the VCE. Cloud orchestration module 1041 manages the transfer and storage of images, deploys new instantiations of VCEs and manages active instantiations of VCE deployments. Gateway 1040 is the collection of computer software, hardware and firmware allowing public cloud 1005 to communicate through WAN 1002.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 1006 is similar to public cloud 1005, except that the computing resources are only available for use by a single enterprise. While private cloud 1006 is depicted as being in communication with WAN 1002, in other embodiments a private cloud can be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 1005 and private cloud 1006 are both part of a larger hybrid cloud.

The embodiments described herein can be directed to one or more of a system, a method, an apparatus and/or a computer program product at any possible technical detail level of integration. The computer program product can include a computer readable storage medium (or media) having computer readable program instructions thereon for causing a processor to carry out aspects of the one or more embodiments described herein. The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a superconducting storage device and/or any suitable combination of the foregoing. A non-exhaustive list of more specific examples of the computer readable storage medium can also include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon and/or any suitable combination of the foregoing. A computer readable storage medium, as used herein, is not to be construed as being transitory signals per se, such as radio waves and/or other freely propagating electromagnetic waves, electromagnetic waves propagating through a waveguide and/or other transmission media (e.g., light pulses passing through a fiber-optic cable), and/or electrical signals transmitted through a wire.

Computer readable program instructions described herein can be downloaded to respective computing/processing devices from a computer readable storage medium and/or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of the one or more embodiments described herein can be assembler instructions, instruction-set-architecture (ISA) instructions, machine instructions, machine dependent instructions, microcode, firmware instructions, state-setting data, configuration data for integrated circuitry, and/or source code and/or object code written in any combination of one or more programming languages, including an object oriented programming language such as Smalltalk, C++ or the like, and/or procedural programming languages, such as the "C" programming language and/or similar programming languages. The computer readable program instructions can execute entirely on a computer, partly on a computer, as a stand-alone software package, partly on a computer and/or partly on a remote computer or entirely on the remote computer and/or server. In the latter scenario, the remote computer can be connected to a computer through any type of network, including a local area network (LAN) and/or a wide area network (WAN), and/or the connection can be made to an external computer (for example, through the Internet using an Internet Service Provider). In one or more embodiments, electronic circuitry including, for example, programmable logic circuitry, field-programmable gate arrays (FPGA) and/or programmable logic arrays (PLA) can execute the computer readable program instructions by utilizing state information of the computer readable program instructions to personalize the electronic circuitry, in order to perform aspects of the one or more embodiments described herein.

Aspects of the one or more embodiments described herein are described with reference to flowchart illustrations and/or block diagrams of methods, apparatus (systems), and computer program products according to one or more embodiments described herein. It will be understood that each block of the flowchart illustrations and/or block diagrams, and combinations of blocks in the flowchart illustrations and/or block diagrams, can be implemented by computer readable program instructions. These computer readable program instructions can be provided to a processor of a general-purpose computer, special purpose computer and/or other programmable data processing apparatus to produce a machine, such that the instructions, which execute via the processor of the computer or other programmable data processing apparatus, can create means for implementing the functions/acts specified in the flowchart and/or block diagram block or blocks. These computer readable program instructions can also be stored in a computer readable storage medium that can direct a computer, a programmable data processing apparatus and/or other devices to function in a particular manner, such that the computer readable storage medium having instructions stored therein can comprise an article of manufacture including instructions which can implement aspects of the function/act specified in the flowchart and/or block diagram block or blocks. The computer readable program instructions can also be loaded onto a computer, other programmable data processing apparatus and/or other device to cause a series of operational acts to be performed on the computer, other programmable apparatus and/or other device to produce a computer implemented process, such that the instructions which execute on the computer, other programmable apparatus and/or other device implement the functions/acts specified in the flowchart and/or block diagram block or blocks.

The flowcharts and block diagrams in the Figures illustrate the architecture, functionality and/or operation of possible implementations of systems, computer-implementable methods and/or computer program products according to one or more embodiments described herein. In this regard, each block in the flowchart or block diagrams can represent a module, segment and/or portion of instructions, which comprises one or more executable instructions for implementing the specified logical function. In one or more alternative implementations, the functions noted in the blocks can occur out of the order noted in the Figures. For example, two blocks shown in succession can be executed substantially concurrently, and/or the blocks can sometimes be executed in the reverse order, depending upon the functionality involved. It will also be noted that each block of the block diagrams and/or flowchart illustration, and/or combinations of blocks in the block diagrams and/or flowchart illustration, can be implemented by special purpose hardware-based systems that can perform the specified functions and/or acts and/or carry out one or more combinations of special purpose hardware and/or computer instructions.

While the subject matter has been described above in the general context of computer-executable instructions of a computer program product that runs on a computer and/or computers, those skilled in the art will recognize that the one or more embodiments herein also can be implemented at least partially in parallel with one or more other program modules. Generally, program modules include routines, programs, components and/or data structures that perform particular tasks and/or implement particular abstract data types. Moreover, the aforedescribed computer-implemented methods can be practiced with other computer system configurations, including single-processor and/or multiprocessor computer systems, mini-computing devices, mainframe computers, as well as computers, hand-held computing devices (e.g., PDA, phone), and/or microprocessor-based or programmable consumer and/or industrial electronics. The illustrated aspects can also be practiced in distributed computing environments in which tasks are performed by remote processing devices that are linked through a communications network. However, one or more, if not all aspects of the one or more embodiments described herein can be practiced on stand-alone computers. In a distributed computing environment, program modules can be located in both local and remote memory storage devices.

As used in this application, the terms "component," "system," "platform" and/or "interface" can refer to and/or can include a computer-related entity or an entity related to an operational machine with one or more specific functionalities. The entities described herein can be either hardware, a combination of hardware and software, software, or software in execution. For example, a component can be, but is not limited to being, a process running on a processor, a processor, an object, an executable, a thread of execution, a program and/or a computer. By way of illustration, both an application running on a server and the server can be a component. One or more components can reside within a process and/or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system and/or across a network such as the Internet with other systems via the signal). As another example, a component can be an apparatus with specific functionality provided by mechanical parts operated by electric or electronic circuitry, which is operated by a software and/or firmware application executed by a processor. In such a case, the processor can be internal and/or external to the apparatus and can execute at least a part of the software and/or firmware application. As yet another example, a component can be an apparatus that provides specific functionality through electronic components without mechanical parts, where the electronic components can include a processor and/or other means to execute software and/or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration. For the avoidance of doubt, the subject matter described herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit and/or device comprising, but not limited to, single-core processors; single-processors with software multithread execution capability; multi-core processors; multi-core processors with software multithread execution capability; multi-core processors with hardware multithread technology; parallel platforms; and/or parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, and/or any combination thereof designed to perform the functions described herein. Further, processors can exploit nano-scale architectures such as, but not limited to, molecular and quantum-dot based transistors, switches and/or gates, in order to optimize space usage and/or to enhance performance of related equipment. A processor can be implemented as a combination of computing processing units.

Herein, terms such as "store," "storage," "data store," data storage," "database," and substantially any other information storage component relevant to operation and functionality of a component are utilized to refer to "memory components," entities embodied in a "memory," or components comprising a memory. Memory and/or memory components described herein can be either volatile memory or nonvolatile memory or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory and/or nonvolatile random-access memory (RAM) (e.g., ferroelectric RAM (FeRAM). Volatile memory can include RAM, which can act as external cache memory, for example. By way of illustration and not limitation, RAM can be available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM) and/or Rambus dynamic RAM (RDRAM). Additionally, the described memory components of systems and/or computer-implemented methods herein are intended to include, without being limited to including, these and/or any other suitable types of memory.

What has been described above includes mere examples of systems and computer-implemented methods. It is, of course, not possible to describe every conceivable combination of components and/or computer-implemented methods for purposes of describing the one or more embodiments, but one of ordinary skill in the art can recognize that many further combinations and/or permutations of the one or more embodiments are possible. Furthermore, to the extent that the terms "includes," "has," "possesses," and the like are used in the detailed description, claims, appendices and/or drawings such terms are intended to be inclusive in a manner similar to the term "comprising" as "comprising" is interpreted when employed as a transitional word in a claim.

The descriptions of the various embodiments have been presented for purposes of illustration but are not intended to be exhaustive or limited to the embodiments described herein. Many modifications and variations will be apparent to those of ordinary skill in the art without departing from the scope and spirit of the described embodiments. The terminology used herein was chosen to best explain the principles of the embodiments, the practical application and/or technical improvement over technologies found in the marketplace, and/or to enable others of ordinary skill in the art to understand the embodiments described herein.

What is claimed is:

1. A system, comprising:

a memory that stores computer executable components; and a processor that executes the computer executable components stored in the memory, wherein the computer executable components comprise:

a pattern component that:

generates a pattern that represents a cluster of entities, wherein the entities have a common type; and types an untyped entity based on the pattern, wherein the common type is assigned to the untyped entity; and a matching component that:

determines whether the pattern is accurately identifying an untyped entity has the same format as a typed entity;

identifies the pattern in a statement, wherein the statement provides context regarding the untyped entity;

determines whether the context matches the type assigned to the untyped entity by the pattern; and in response to a determination that the context matches the type assigned by the pattern to the untyped entity, retains the pattern; and a named entity recognition model comprising one or more semantic models, that updates the one or more sematic models based on the pattern.

2. The system of claim 1, wherein one or more entities in the cluster of entities are respectively identified by a string.

3. The system of claim 2, wherein the string is at least one of a sequence of speech, text, alphanumerics, letters, or numbers.

4. The system of claim 2, further comprising:

a code component that identifies one or more codes within the string respectively pertaining to the one or more entities in the cluster of entities.

5. The system of claim 4, further comprising:

a weight component that applies a weight to the code identified in the one or more codes.

6. The system of claim 5, further comprising:

a vector component that vectors the weighted codes to create the cluster.

7. The system of claim 1, wherein the pattern pertains to a Named-Entity Recognition domain.

8. The system of claim 1, wherein the matching component, in response to a determination that the context does not match the type assigned by the pattern to the untyped entity, discards the pattern.

9. A computer-implemented method comprising:

generating, by a device operatively coupled to a processor, a pattern that represents a cluster of entities, wherein the entities have a common type; and typing, by the device, an untyped entity based on the pattern, wherein the common type is assigned to the untyped entity;

determining, by the device, whether the pattern is accurately identifying an untyped entity has the same format as a typed entity;

identifying, by the device, the pattern in a statement, wherein the statement provides context regarding the untyped entity;

determining, by the device, whether the context matches the type assigned to the untyped entity by the pattern;

in response to a determination that the context matches the type assigned by the pattern to the untyped entity, retaining the pattern; and updating, by the device, one or more semantic models of a named entity recognition model based on the pattern.

10. The computer-implemented method of claim 9, wherein the one or more entities in the cluster of entities are respectively identified by a string, the respective string is at least one of a sequence of speech, text, alphanumerics, letters, or numbers.

11. The computer-implemented method of claim 9, further comprising:

identifying, by the device, one or more codes within the string respectively pertaining to the one or more entities in the cluster of entities;

applying, by the device, a weight to the code identified in the one or more codes; and vectorizing, by the device, the weighted codes to create the cluster.

12. The computer-implemented method of claim 9, further comprising:

in response to determining that the context does not match the type assigned by the pattern to the untyped entity, discarding the pattern and removing the type assigned by the pattern.

13. A computer program product comprising a computer readable storage medium having program instructions embodied therewith, the program instructions executable by a processor to cause the processor to:

generate, by the processor, a pattern that represents a cluster of entities, wherein the entities have a common type; and type, by the processor, an untyped entity based on the pattern, wherein the common type is assigned to the untyped entity; and identify, by the processor, the pattern in a statement, wherein the statement provides context regarding the untyped entity;

determine, by the processor, whether the context matches the type assigned to the untyped entity by the pattern;

in response to a determination that the context matches the type assigned by the pattern to the untyped entity, retain the pattern; and update, by the processor, one or more semantic models of a named entity recognition model based on the pattern.

14. The computer program product of claim 13, wherein one or more entities in the cluster of entities is identified by a string, the string is at least one of a sequence of speech, text, alphanumerics, letters, or numbers.

15. The computer program product of claim 13, wherein the program instructions are further executable by the processor to cause the processor to:

identify, by the processor, one or more codes within the string respectively pertaining to the one or more entities in the cluster of entities;

apply, by the processor, a weight to the code identified in the one or more codes; and vectorize, by the processor, the weighted codes to create the cluster.

16. The computer program product of claim 13, wherein the program instructions are further executable by the processor to cause the processor to:

in response to a determination that the context does not match the type assigned by the pattern to the untyped entity, discard the pattern and remove the type assigned by the pattern.

* * * * *